(12) United States Patent
Stothers et al.

(10) Patent No.: US 8,788,106 B2
(45) Date of Patent: Jul. 22, 2014

(54) POWER CONTROL SYSTEM

(75) Inventors: Ian M. Stothers, Norfolk (GB); Daniel Z. Schneider, London (GB)

(73) Assignee: Ultra Electronics Limited, Greenford (GB)

( * ) Notice: Subject to any disclaimer, the term of this patent is extended or adjusted under 35 U.S.C. 154(b) by 1208 days.

(21) Appl. No.: 12/602,087

(22) PCT Filed: May 28, 2008

(86) PCT No.: PCT/GB2008/001802
§ 371 (c)(1),
(2), (4) Date: Jul. 1, 2010

(87) PCT Pub. No.: WO2008/145985
PCT Pub. Date: Dec. 4, 2008

(65) Prior Publication Data
US 2010/0282910 A1    Nov. 11, 2010

(30) Foreign Application Priority Data

May 29, 2007    (GB) .................................. 0710214.8

(51) Int. Cl.
*G05D 3/12* (2006.01)
*G05D 5/00* (2006.01)
*G05D 9/00* (2006.01)
*G05D 11/00* (2006.01)
*G05D 17/00* (2006.01)

(52) U.S. Cl.
USPC ............................ 700/286; 700/291; 700/295

(58) Field of Classification Search
USPC .......................................... 700/286, 291, 295
See application file for complete search history.

(56) References Cited

U.S. PATENT DOCUMENTS 4,146,923 A    3/1979  Borkan
4,216,384 A    8/1980  Hurley
(Continued)

FOREIGN PATENT DOCUMENTS

DE    195 30 826 C1    1/1997
EP    1 160 545 A1    12/2001
(Continued)

OTHER PUBLICATIONS

B.N. Singh, et al., "A New Topology of Active Filter to Correct Power-Factor, Compensate Harmonics, Reactive Power and Unbalance of Three-Phase Four-Wire Loads," IEEE, pp. 141-147, 2003.
(Continued)

*Primary Examiner* — Ronald Hartman, Jr.
(74) *Attorney, Agent, or Firm* — Stephen A. Soffen

(57) ABSTRACT

A method is disclosed for controlling the distribution of power to a plurality of devices, the method being carried out during a plurality of time periods, and the method during each time period after the first comprising: determining (S700) an energy or power deficit for each device based on the difference between a target amount of energy or power and a measured amount of energy or power supplied to the device prior to the current time period; selecting (S702) at least one device in decreasing order of energy or power deficit, whereby priority is given to devices having the largest energy or power deficit or the smallest energy or power surplus, until the selection of any further devices will cause a total estimated power consumption of the selected devices during the time period to exceed a predetermined maximum power consumption; and supplying (S704) power to the or each selected device during the time period.

43 Claims, 15 Drawing Sheets

(56) References Cited

U.S. PATENT DOCUMENTS

| | | | |
|---|---|---|---|
| 5,148,362 A | 9/1992 | Braun et al. | |
| 5,436,510 A | 7/1995 | Gilbert | |
| 5,932,128 A | 8/1999 | Dishop | |
| 6,566,633 B2 | 5/2003 | Kitada | |
| 6,671,586 B2* | 12/2003 | Davis et al. | 700/295 |
| 6,757,185 B2 | 6/2004 | Rojas Romero | |
| 6,849,833 B2 | 2/2005 | Harrington et al. | |
| 6,901,226 B2 | 5/2005 | Claassen | |
| 8,319,370 B2* | 11/2012 | Itoh et al. | 307/21 |
| 2004/0075343 A1 | 4/2004 | Wareham et al. | |
| 2005/0281067 A1 | 12/2005 | Deng et al. | |
| 2010/0161146 A1* | 6/2010 | Boss et al. | 700/291 |
| 2012/0209442 A1* | 8/2012 | Ree | 700/295 |
| 2012/0323398 A1* | 12/2012 | Boss et al. | 700/297 |

FOREIGN PATENT DOCUMENTS

| | | | |
|---|---|---|---|
| JP | 2004-120968 A | 4/2004 | |
| WO | WO 99/44276 A1 | 9/1999 | |
| WO | WO 02/31944 A2 | 4/2002 | |
| WO | WO 2007/054914 A2 | 5/2007 | |

OTHER PUBLICATIONS

B. Singh, et al., "Power Factor Correction and Load Balancing in Three-Phase Distribution Systems," IEEE, pp. 479-483, 1998.

S. Jin, et al., "A Novel Decoupled Control Strategy for Three-Phase AC Power Supply," IEEE, pp. 278-281, 2002.

A. Elmitwally, et al., "Performance Evaluation of Fuzzy Controlled Three and Four Wire Shunt Active Power Conditioners," IEEE, pp. 1650-1655, 2000.

D. Chapman, et al., "A High Density 48V 200A Rectifier with Power Factor Correction—An Engineering Overview," pp. 118-125.

* cited by examiner

HEATER ZONE

RUNNING SUM OF ENERGY (NORMALISED)

S1000

| A | B | C | D | E | F |
|---|---|---|---|---|---|
| 0 | 0 | 0 | 0 | 0 | 0 |

S1002

| A | B | C | D | E | F |
|---|---|---|---|---|---|
| 0 | 0 | 0 | 0 | 0 | 0 |

1.10  1.00  1.15  1.20  0.95  1.05  kW 5.4 kW

S1004

HEATER SWITCHING

| A | B | C | D | E | F |
|---|---|---|---|---|---|
| ✓ | ✓ | ✓ | ✓ | ✓ | ✗ |

S1006

MEASURED ENERGY CONSUMPTION (NORMALISED)

| A | B | C | D | E | F |
|---|---|---|---|---|---|
| 1.20 | 1.00 | 1.33 | 1.27 | 0.93 | 0.0 |

S1008

| A | B | C | D | E | F |
|---|---|---|---|---|---|
| 1.20 | 1.00 | 1.33 | 1.27 | 0.93 | 0.00 |

S1010

| A | B | C | D | E | F |
|---|---|---|---|---|---|
| 0.20 | 0.00 | 0.33 | 0.27 | -0.07 | -1.00 |

S1012

| F | E | B | A | D | C |
|---|---|---|---|---|---|
| -1.00 | -0.07 | 0.00 | 0.20 | 0.27 | 0.33 |

1.18  1.20  1.07  1.09  1.10  1.12  kW 5.64 kW

S1014

| A | B | C | D | E | F |
|---|---|---|---|---|---|
| ✓ | ✓ | ✗ | ✓ | ✓ | ✓ |

S1016

| A | B | C | D | E | F |
|---|---|---|---|---|---|
| 1.03 | 0.97 | 0.0 | 1.00 | 1.17 | 1.10 |

S1018

| A | B | C | D | E | F |
|---|---|---|---|---|---|
| 1.23 | 0.97 | 0.33 | 1.27 | 1.10 | 0.10 |

S1020

| A | B | C | D | E | F |
|---|---|---|---|---|---|
| 0.23 | -0.03 | -0.67 | 0.27 | 0.10 | -0.90 |

S1022

| F | C | B | E | A | D |
|---|---|---|---|---|---|
| -0.90 | -0.67 | -0.03 | 0.10 | 0.23 | 0.27 |

1.19  1.15  1.16  1.05  1.07  1.10  kW 5.62 kW

S1024

| A | B | C | D | E | F |
|---|---|---|---|---|---|
| ✓ | ✓ | ✓ | ✗ | ✓ | ✓ |

S1026

| A | B | C | D | E | F |
|---|---|---|---|---|---|
| 1.10 | 1.03 | 1.27 | 0.0 | 1.23 | 1.13 |

Fig. 10

POWER CONTROL SYSTEM

The present invention relates to a method and apparatus for controlling the distribution of power from a power supply to a plurality of devices.

Electrothermal ice protection systems for aircraft are an example of a system in which power is supplied to a plurality of devices. Electrical ice protection systems prevent a potentially catastrophic build-up of ice on wing tips and other aerodynamic surfaces of an aircraft during flight, by delivering large quantities of electrical power to heating elements on the aircraft wings. Electrothermal ice protection systems can be the single largest consumers of electrical power on an aircraft, and they are powered by high voltage outputs (three-phase AC or DC) from generators attached to the aircraft engines.

Electrothermal ice protection systems comprise a large number of heater mats, which can be used as anti-icing zones in which an essentially constant temperature is maintained at the surface of the wing in order to prevent the formation of ice. These mats can also be used as de-icing zones to shed ice that has been allowed to accrete on the protected region. The de-icing mats are cyclically energised in order to melt the interface between the wing and the accreted ice, causing the ice to be shed. The anti-icing and de-icing zones are thermostatically controlled in order to avoid overheating of the heater mats; otherwise delamination of the wing may occur, leading to catastrophic failure of the aircraft.

Factors such as the thermostatic control and the variation of de-icing cycles in dependence on environmental conditions can cause relatively large and unpredictable variations in the power consumption of an ice protection system. Such variations in power consumption can create an imbalance in loading of the three phases of the generator power supply, which in turn can lead to excessive neutral currents and power overloads at the generator. Variation in the resistance of the heater elements caused by aging or inconsistency in manufacture (or simply by design) can also cause variation in the power consumption. The power control systems of the aircraft may interpret an imbalance in loading as a fault condition and may remove the ice protection systems from the power bus, leading to a potentially catastrophic failure of the aircraft.

It is possible to correct an imbalance in a three-phase load by providing active filtering and energy storage devices (such as inductors and capacitors). However, such an arrangement is more suitable for correcting the power factor of a reactive load than for correcting large variations in magnitude of essentially resistive loads, and it is not practical to adapt such a device for use with an aircraft ice protection system due to size and weight concerns.

Similar issues relating to overloading and/or phase imbalances can arise in other single-phase AC, multiple-phase AC and DC systems in which power is distributed to a plurality of devices. An alternative approach is therefore desirable.

In a first aspect of the invention, there is provided a method of controlling the distribution of power to a plurality of devices, the method being carried out during a plurality of time periods, and the method during each time period after the first comprising: determining an energy or power deficit for each device based on the difference between a target amount of energy or power and a measured amount of energy or power supplied to the device prior to the current time period; selecting at least one device in decreasing order of energy or power deficit, whereby priority is given to devices having the largest energy or power deficit or the smallest energy or power surplus, until the selection of any further devices will cause a total estimated power consumption of the selected devices during the time period to exceed a predetermined maximum power consumption; and supplying power to the or each selected device during the time period. The power or energy deficit can be positive (indicating that less energy or power has been supplied to the relevant device than was intended or desired) or negative (indicating that more energy or power has been supplied to the relevant device than was required). Preferably the power is not supplied to unselected devices.

This method can ensure that the power used by a system varies by no more than the power consumption of a single device. When applied to all three phases of a three-phase power supply, no phase will normally differ from any other by more than approximately the power consumption of a single element. Thus the neutral current will be similarly constrained, and the phases can be balanced to a relatively high degree. If a yet smaller neutral current is required, the devices can (if applicable) be divided into switchable subunits having a smaller power consumption (and thus permitting finer control of the total power consumption). As an additional benefit, the total power consumption is also constrained close to the predetermined maximum power consumption, making efficient use of the available power.

As noted above, the present invention is applicable for use in aircraft ice protection systems, but it will be appreciated that the invention has wider applicability, for example generally in avionics or in vehicles, where there is a benefit in being able to balance or limit power consumption without having to provide potentially bulky and high weight active filters and energy storage devices.

The present invention is also suitable for use in a large number of power supply schemes, including single or multiple phase AC power systems and DC power supplies. The present invention is also suitable for use in high power switching systems. In this regard it is noted that, instead of modulating the switch state of the devices between fully on and fully off, it is possible to design switches that can deliver variable amounts of power to the devices (potentially allowing a steadier power/voltage level to be supplied to the devices). However in high power applications it is usually preferable to use 'binary' switching, because a partially-open switch can dissipate a relatively large amount of power internally, potentially leading to a considerable loss in efficiency and failure by overheating.

For time periods other than the first, the determination of an energy or power deficit for each device may comprise subtracting (a) a target (that is, desired or required, for example) amount of energy or power desired to be supplied to the device during the preceding time period from the sum of: (b) a measurement of the actual amount of energy or power supplied to the device during the preceding time period, and (c) the determined energy or power deficit of the preceding time period. For the first time period, the method may comprise setting the energy or power deficit to an initialisation value. (such as zero or any other constant value).

The selection of at least one device may comprise arranging device data (such as a data object, linked list or table of data) associated with respective devices into a list sorted by decreasing size of energy or power deficit of each respective device; selecting device data from the top of the list (that is, the beginning); calculating the total estimated power consumption of the devices associated with the selected device data; and continuing the selection of device data until the selection of any further device data would cause the total estimated power consumption to exceed the predetermined maximum power consumption.

Supplying power to the or each selected device may comprise switching on the or each selected device and switching off unselected devices.

The power supply may be an alternating current power supply, and the method may further comprise switching the or each device at zero-crossing points of the current or voltage of the power supply. This can avoid power spikes and reduce interference.

The power supply may be one phase of a multiple phase power supply, in which case the method may further comprise repeating the method in respect of the or each further phase of the multiple phase power supply. As noted above, this can reduce any imbalance of loading on the three phases, and therefore reduce the neutral current flowing back to a generator.

The method may further comprise processing a signal representative of an imbalance in the current or voltage of the multiple phases, and adjusting the maximum power consumption in order to reduce the imbalance. When the power supply includes a neutral path, the method may further comprise supplying power during at least one time period through only a selected one of the phases, processing a signal representative of a measurement of the current flowing through the neutral path, and determining an electrical property of at least one of the devices connected to said selected one of the phases in dependence on the current measurement. The method may further comprise calibrating an electrical sensor connected to said selected one of the phases in dependence on the determined electrical property.

The plurality of devices may comprise a plurality of heater elements, and the time period may be less than the thermal time constant of at least one of the heater elements. This can avoid any significant drops in heater temperature as a result of the heater being switched off during a time period. Additional modulation can be provided, for example on a much longer time scale, to carry out de-icing processes (where de-icing heater mats are turned on for a number of seconds and then turned off for a larger number of seconds).

In the above-mentioned method, the energy or power deficit may be normalised with respect to the target amount of energy or power respectively. This can prevent devices with a relatively large target amount of energy or power being switched in preference to devices with a relatively small target amount of energy (all other things being equal).

In another aspect, the invention provides apparatus for controlling the distribution of power to a plurality of devices during a plurality of time periods, the apparatus comprising: means for determining an energy or power deficit for each device during each time period, the determination being based on the difference between a target amount of energy or power and a measured amount of energy or power supplied to the device prior to the time period; means for selecting at least one device during each time period in decreasing order of energy or power deficit, whereby priority is given to devices having the largest energy or power deficit or the smallest energy or power surplus, until the selection of any further devices will cause a total estimated power consumption of the selected devices during the time period to exceed a predetermined maximum power consumption; and means for supplying power to the or each selected device during each time period.

In a further aspect, the invention provides a vehicle comprising: a power supply; a plurality of devices; and apparatus as aforesaid, for supplying power from the power supply to the plurality of devices.

In a yet further aspect, the invention provides an ice protection system for an aircraft, including apparatus as aforesaid.

In another aspect of the invention there is provided a power controller for controlling the distribution of power to a plurality of devices during a plurality of time periods, comprising: a switching unit for switching power to said plurality of devices; an instruction memory storing processor implementable instructions; and a processor operable to process data in accordance with instructions stored in the instruction memory; wherein the instructions stored in the instruction memory comprise instructions for controlling the processor to perform a method comprising: determining an energy or power deficit during each time period for each device based on the difference between a target amount of energy or power and a measured amount of energy or power supplied to the device prior to the time period; selecting at least one device during each time period in decreasing order of energy or power deficit, whereby priority is given to devices having the largest energy or power deficit or the smallest energy or power surplus, until the selection of any further devices will cause a total estimated power consumption of the selected devices during the time period to exceed a predetermined maximum power consumption; and supplying power to the or each selected device during the time period.

The present invention can be implemented in any convenient form, for example using dedicated hardware, or a mixture of dedicated hardware and software. The invention may further comprise a data network, which can include any local area network or even wide area, conventional terrestrial or wireless communications network. Aspects of the present invention encompass computer software implementable on a programmable device. The computer software can be provided to the programmable device using any conventional carrier medium. The carrier medium can comprise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as a floppy disk, hard disk, CD ROM, magnetic tape device or solid-state memory device.

Although each aspect and various features of the present invention have been defined hereinabove independently, it will be appreciated that, where appropriate, each aspect can be used in any combination with any other aspect(s) or features of the invention.

Embodiments of the present invention will now be described with reference to the accompanying drawings, in which:

FIG. 10 is an illustration of the operation of a heater system in accordance with the process of FIG. 9;

Figure 1:
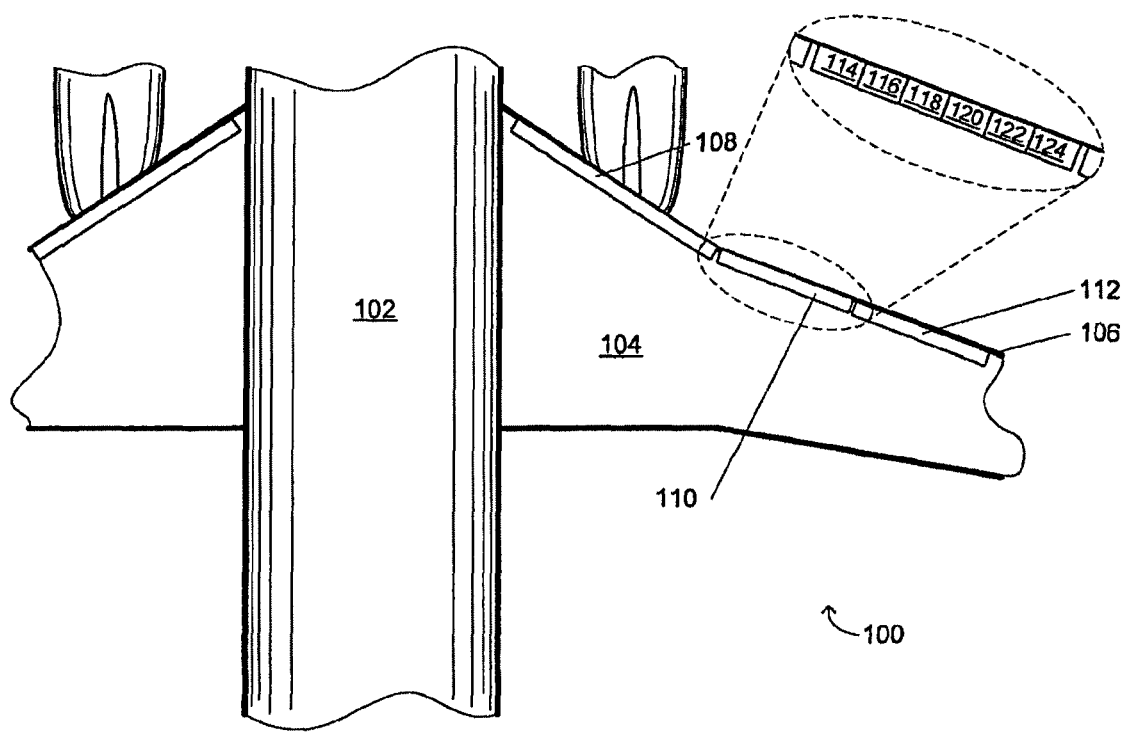
FIG. 1 is an illustration of the placement of de-icing heater mats and heater zones on an aircraft.

FIG. 1 is an illustration of a portion of an aircraft, showing the placement of heater mats and heater zones. The aircraft 100 includes a fuselage portion 102 and a wing portion 104. On the leading edge 106 of the wing 104 are provided a plurality of heating mats 108, 110, 112 and others (not shown).

Each heater mat is divided into a number of heater zones. The number and size of the heater zones are chosen to suit a particular safety model, for example such that up to two heater zones can fail without causing a hazardous or catastrophic failure of the aircraft. In one aircraft design, safety requirements require each heater mat 110 to be divided into six separate heater zones 114, 116, 118, 120, 122, 124.

Figure 2:
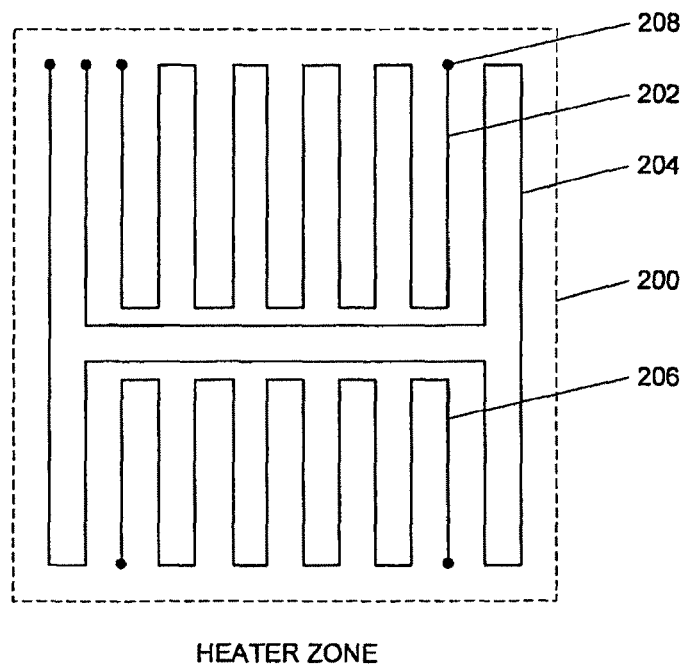
FIG. 2 is a schematic showing the placement of heater elements within a heater zone.

FIG. 2 shows the structure of a heater zone. The heater zone 200 comprises an upper de-icing element 202, a central anti-icing element 204, and a lower de-icing element 206. The elements take the form of resistance heater wires arranged in a serpentine configuration and embedded within the heater mat. The elements are provided with contacts 208 to allow power to be applied to the element.

In accordance with known de-icing techniques, the ice protection system maintains the anti-icing element 204 at a temperature sufficient to prevent ice forming above the element, and intermittently cycles power to the de-icing elements 202, 206 to shed any ice formed above them by run-off water from the anti-icing zone, for example.

Figure 3:
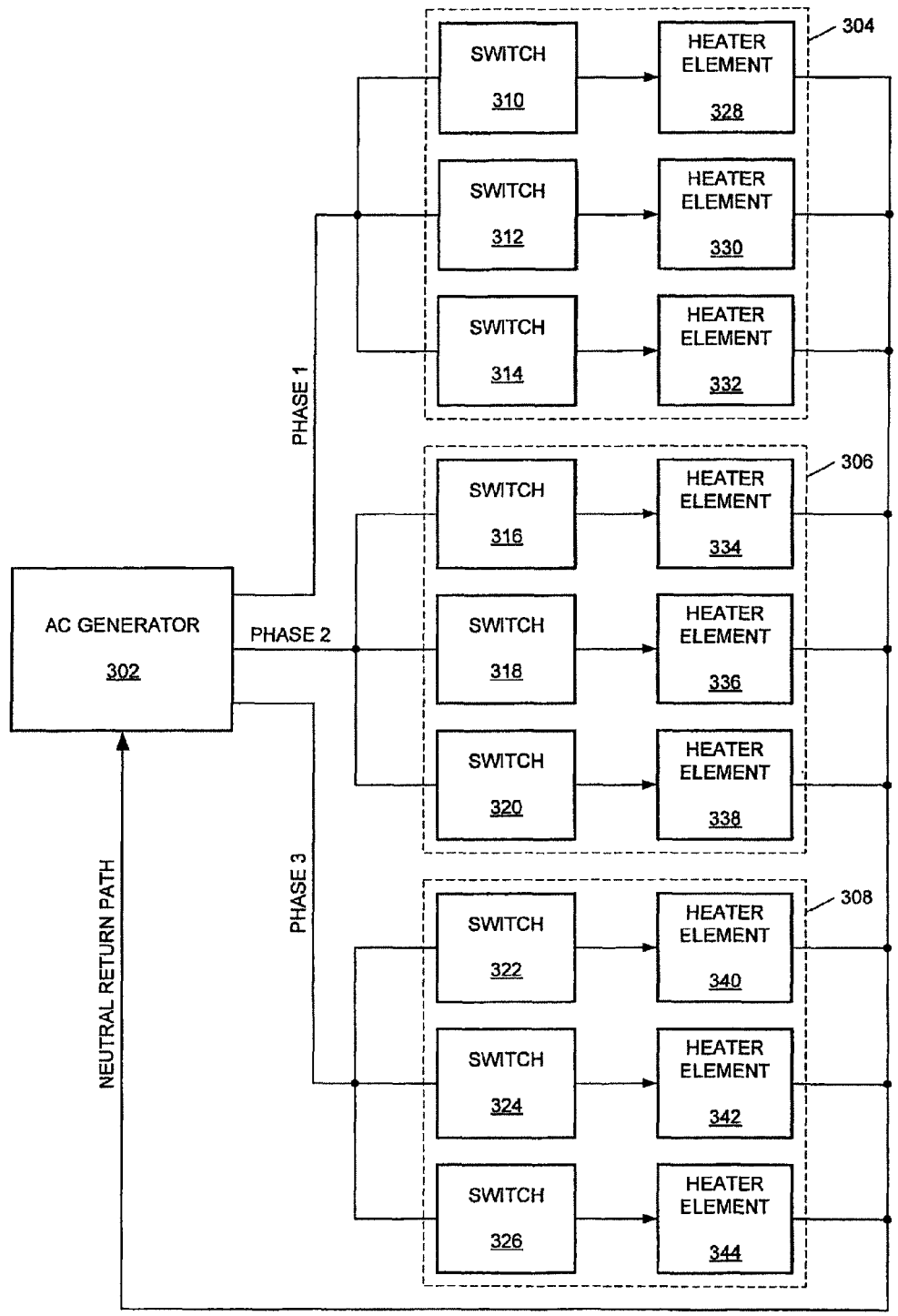
FIG. 3 is a schematic showing the connection of a plurality of heater elements to a three-phase power supply.

FIG. 3 is a schematic showing the connection of the heater elements to a three-phase power supply.

The AC generator 302 provides a three phase AC power supply, and is used to power other avionic systems in the aircraft. In one embodiment two AC generators are provided in the aircraft, each driven by one of the engines, but only one is shown here for simplicity.

The heater elements are provided in three groups 304, 306, 308, where the first group 304 is supplied by power from the first phase of the power supply, the second group 306 is supplied by power from the second phase of the power supply, and the third group 308 is supplied by power from the third phase of the power supply.

A plurality of switches 310, 312, 314, 316, 318, 320, 322, 324, 326 are provided to allow each of the heater elements 328, 330, 332, 334, 336, 338, 340, 342, 344 to be independently controlled. In one embodiment, a total of 144 heater elements and associated switches are provided, but for simplicity only 9 of these are shown in FIG. 3. The heater elements are attached to a neutral line that feeds back into the AC generator 302.

Figure 4:
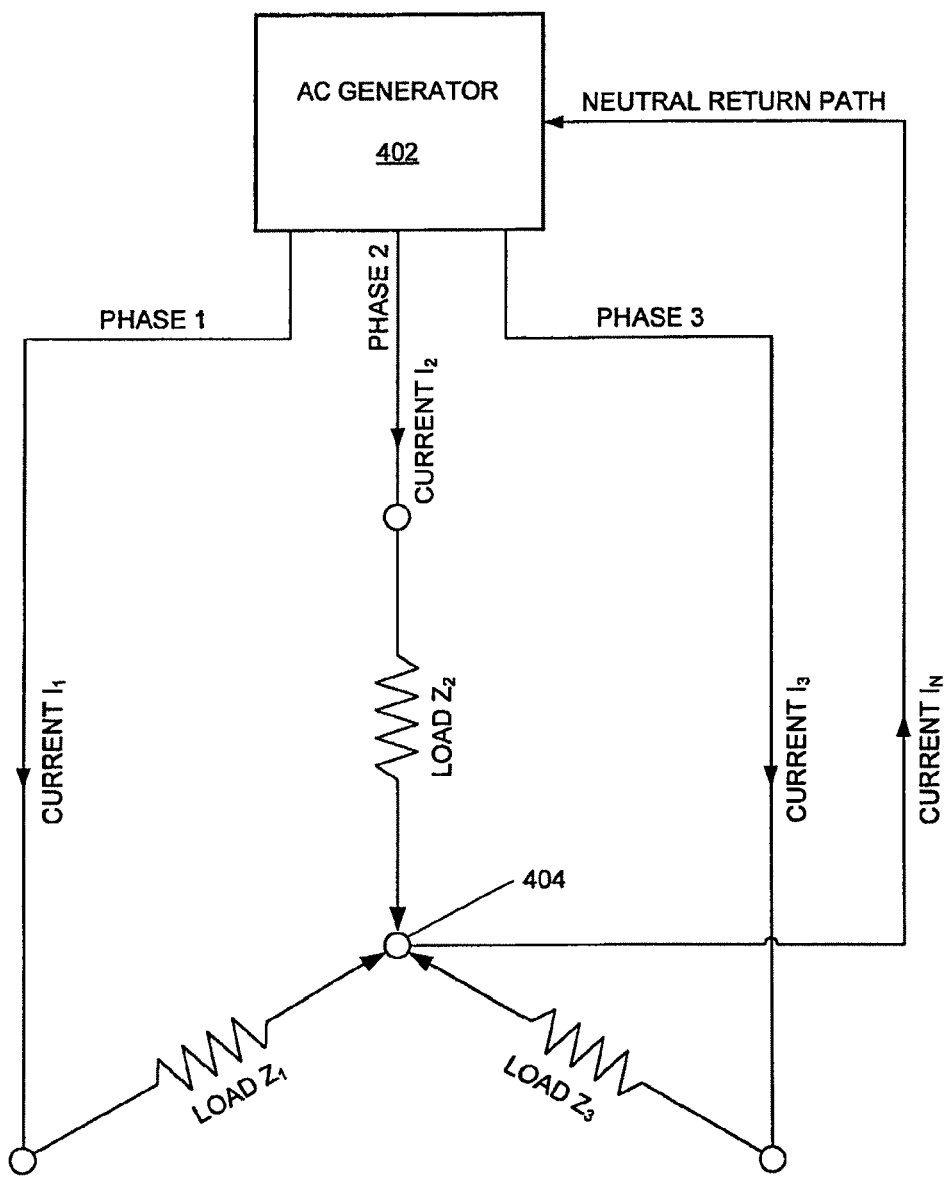
FIG. 4 is a schematic showing a simplified form of the circuit of FIG. 3.

FIG. 4 is a schematic showing the circuit of FIG. 3 in simplified form. Again the AC generator 402 is shown. Each of the heater groups of FIG. 3 can be represented by a respective load $Z_1$, $Z_2$ and $Z_3$, attached in a star configuration, with a neutral line again feeding back to the generator 402. The impedance of each load $Z_1$, $Z_2$ and $Z_3$ depends on the state of the switches associated with the heating elements and other factors.

The phases have an AC voltage V (in one embodiment approximately 230 VAC at 400 Hz), and associated currents $I_1$, $I_2$ and $I_3$, which can be computed as: $I_n=V/Z_n$. Due to the conservation of current, the neutral current $I_3$ exiting the point 404 must be equal to the currents $I_1+I_2+I_3$ entering it. When the power consumed by the heater elements is equal, the loads $Z_1$, $Z_2$ and $Z_3$ are also equal, and the currents $I_1+I_2+I_3$ will cancel out, resulting in a zero neutral current $I_n$.

If different power is consumed by the different heater groups, the loads $Z_1$, $Z_2$ and $Z_3$ will not be equal, and a neutral current $I_n$ will flow. The greater the imbalance of power, the greater the neutral current that will flow. It is normally desired to balance the phases as much as possible, for example because the neutral power lines may not have a high power rating, and because the AC generator may be sensitive to any imbalances in loading. An aircraft generator may not tolerate a neutral current of more than 10% of a phase current, for example. If an aircraft component starts producing a relatively high neutral current it may be 'dumped' from the aircraft power system, potentially causing a catastrophic failure of the aircraft.

Figure 5:
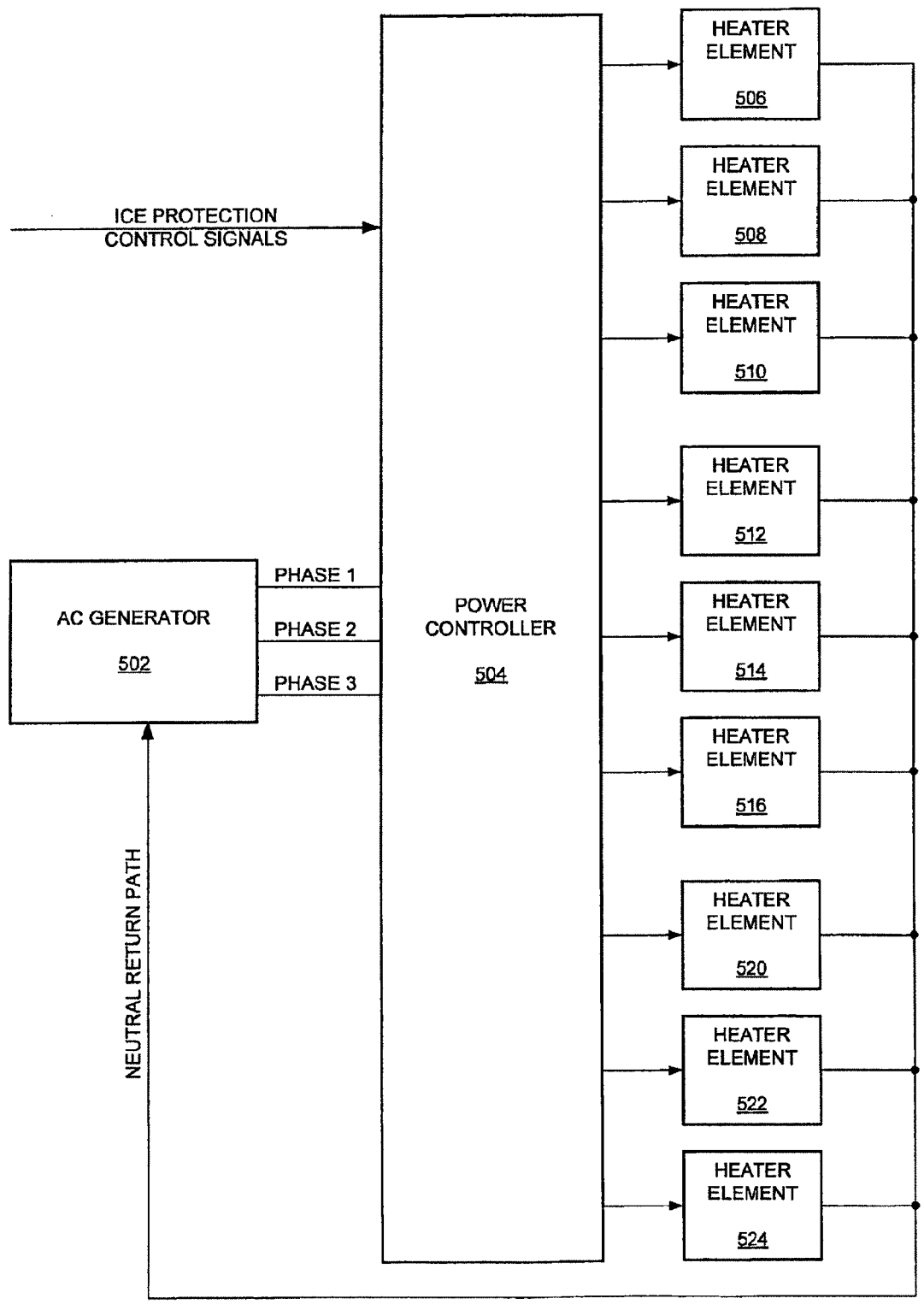
FIG. 5 is a schematic showing a power control system in overview.

FIG. 5 is a schematic showing in overview a system for supplying power to the plurality of heater elements. Again, an AC generator 502 is shown, providing three phases of power. A power controller 504 controls the power from the generator 502 and receives ice protection control signals from the aircraft avionics systems. In turn, the power controller 504 is connected to a plurality of heater elements 506, 508, 510, 512, 514, 516, 518, 520, 522, 524. The heater elements are connected back to the generator 502 via a neutral line.

The power controller 504 incorporates the switches shown in FIG. 3 and controls the switching of power to the heating elements in such a way as to attempt to minimise the neutral current flow. It does so in accordance with a process described in more detail below with reference to FIGS. 7 to 13.

Figure 6:
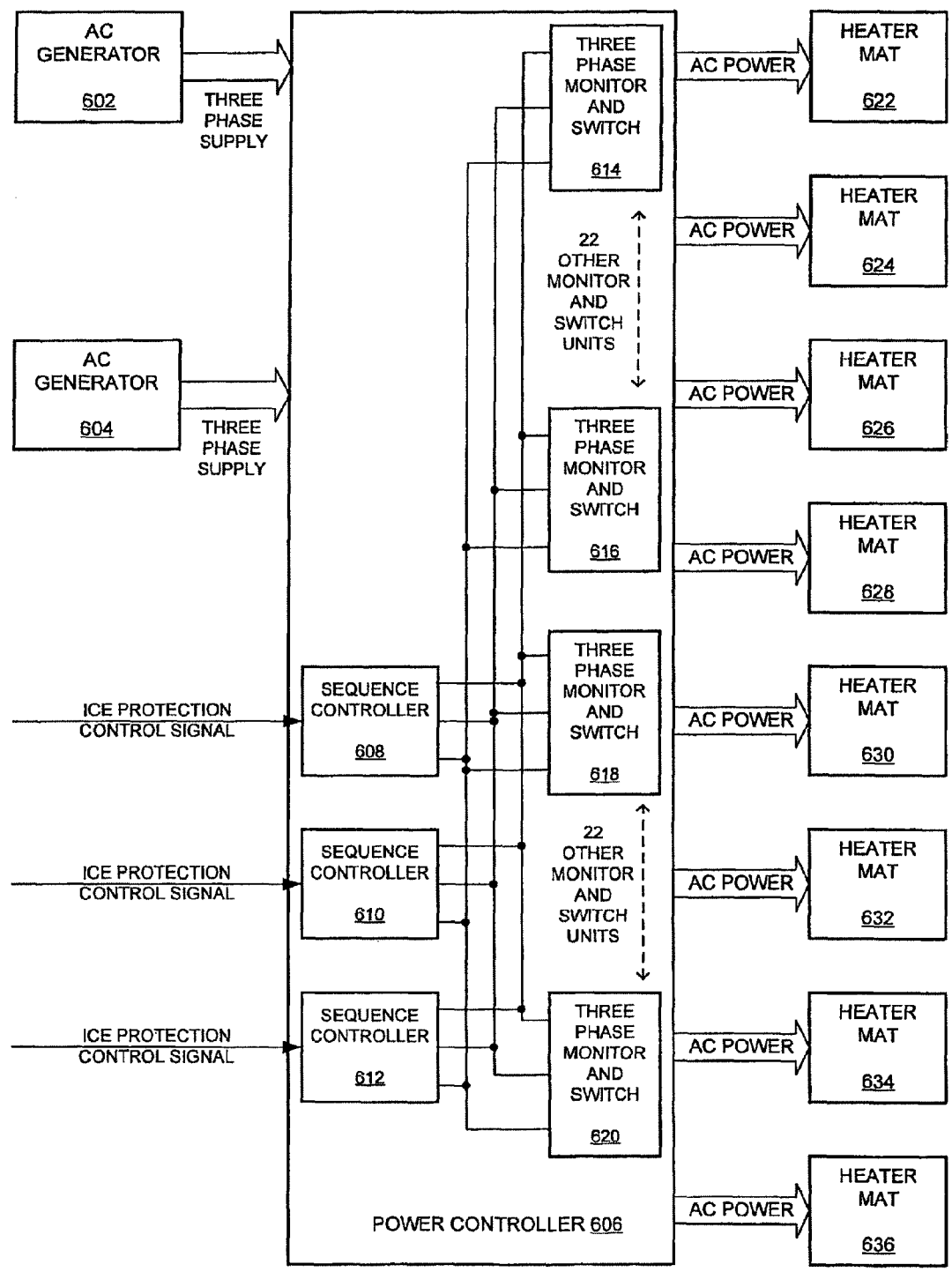
FIG. 6 is a schematic showing the system of FIG. 5 in more detail.

FIG. 6 is a schematic showing the system of FIG. 5 in more detail. This time, both AC generators 602, 604 are shown. The generators provide a three phase power supply to the power controller 606. Within the power controller 606, three sequence controllers 608, 610, 612 are provided, to drive faulty-eight three phase monitor and switch units 614, 616, 618, 620. Three sequence controllers are provided for redundancy, to ensure continued operation of the system in the event of the failure of one of the controllers. Further redundancy is provided at the switching level (not shown).

Ice protection control signals are provided to the sequence controllers 608, 610, 612 from other aircraft avionics systems. The power controller 606 is connected to the eight sets of heater mats 622, 624, 626, 628, 630, 632, 634, 636 on the aircraft via AC power cable bundles. As described above, each heater mat contains six heater zones, and each heater zone contains three heater elements. Each AC power cable bundle thus contains a total of 18 power wires and a neutral line. In total, 144 switched power lines are provided.

The control process used by the power controller will now be described with reference to FIGS. 7 to 15.

The controller is constrained by a total power target ($P_{TARGET}$), which is the maximum power consumption permitted by the generators for the heating elements in each phase of the power supply. Each heating element (e) also has a power target ($P_{Te}$) for effective heating.

The control process operates by switching the heating elements on a periodic basis, with a time period t between switching operations. A target amount of energy $E_{Te}$ to be converted by each heating element during each time period can be derived from the power target $P_{Te}$ for each element ($E_{Te}=P_{Te}\times t$). In the present embodiment, a time period t of 30 ms is chosen, giving an energy target $E_{Te}$ of 30 J for a heating element with a power target $P_{Te}$ of 1 kW.

Different values for these properties may be used for different aircraft and may be varied depending on environmental conditions (for example, different levels of de-icing may be required depending on the water content of the air). The necessary adjustments can be communicated to the power controller via the ice protection control signals, for example.

A further concept used by the control system is the energy deficit, or running sum of energy consumed ($RSEC_e$)—a measure of the amount of energy by which a heating element is lagging (or exceeding) its target of energy (heat) conversion. In the present embodiment the running sum of energy consumed ($RSEC_e$) is normalised in terms of target energy consumption. This can prevent power being allocated disproportionately to high power devices. In a variant described below, the running sum of energy consumed is not normalised. This can provide reasonable results and simplify the processing when all elements in the system draw have similar target energy conversions.

Figure 7:
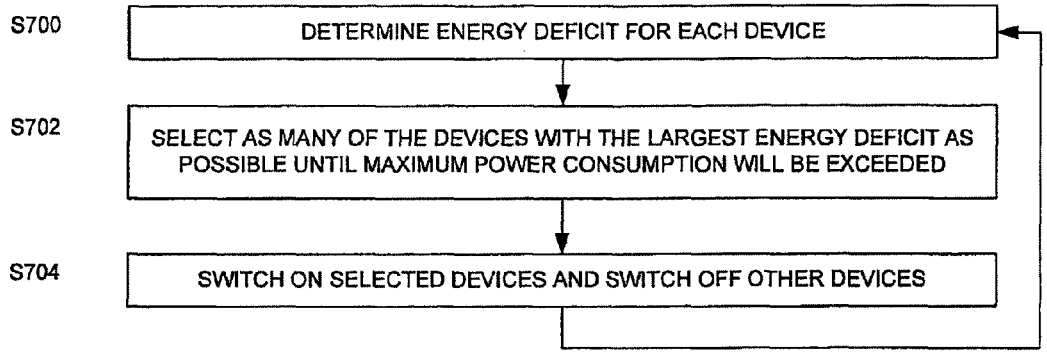
FIG. 7 is a flowchart illustrating a power control process.

FIG. 7 is a flowchart illustrating the power control process in overview.

In step S700, the (normalised) energy deficit ($RSEC_e$) is determined for each device (heating element).

In step S702, devices are selected until the sum of the estimated power consumption of each device would exceed the target power level for the relevant phase of the power supply ($P_{TARGET}$). The devices with the greatest energy deficits are selected in preference to those with lower energy deficits.

In step S704 the devices (heating elements) are then switched such that the selected devices are enabled (switched on) and the remaining devices are disabled (switched off). When the time period t has elapsed, the process is repeated. The process is also repeated for each of the phases of the power supply.

As is explained below with reference to FIG. 15, the effect of this process is to regulate the power in each of the phases, so that it does not exceed the target power, and also to balance the phases. The process also ensures that all of the heating elements receive an approximately equal share of the power, avoiding any 'cold spots' which may lead to ice formation and degradation of the aerodynamic performance of the aircraft (for example).

The estimation of the power consumption of heating elements is carried out by considering factors such as the current heating element temperature, icing conditions, phase voltage, and so on, but a constant value may also be used when appropriate.

The time period t discussed above is 30 milliseconds, but in practice this time period can vary. If the time period varies considerably, the target energy consumption may need to be recomputed dynamically. It is in fact preferred to delay switching the heating elements until the zero-crossing point of the power supply (current or voltage), which can vary the time period t by approximately 1.25 milliseconds for example (the half-cycle period of a 400 Hz power supply).

Figure 8:
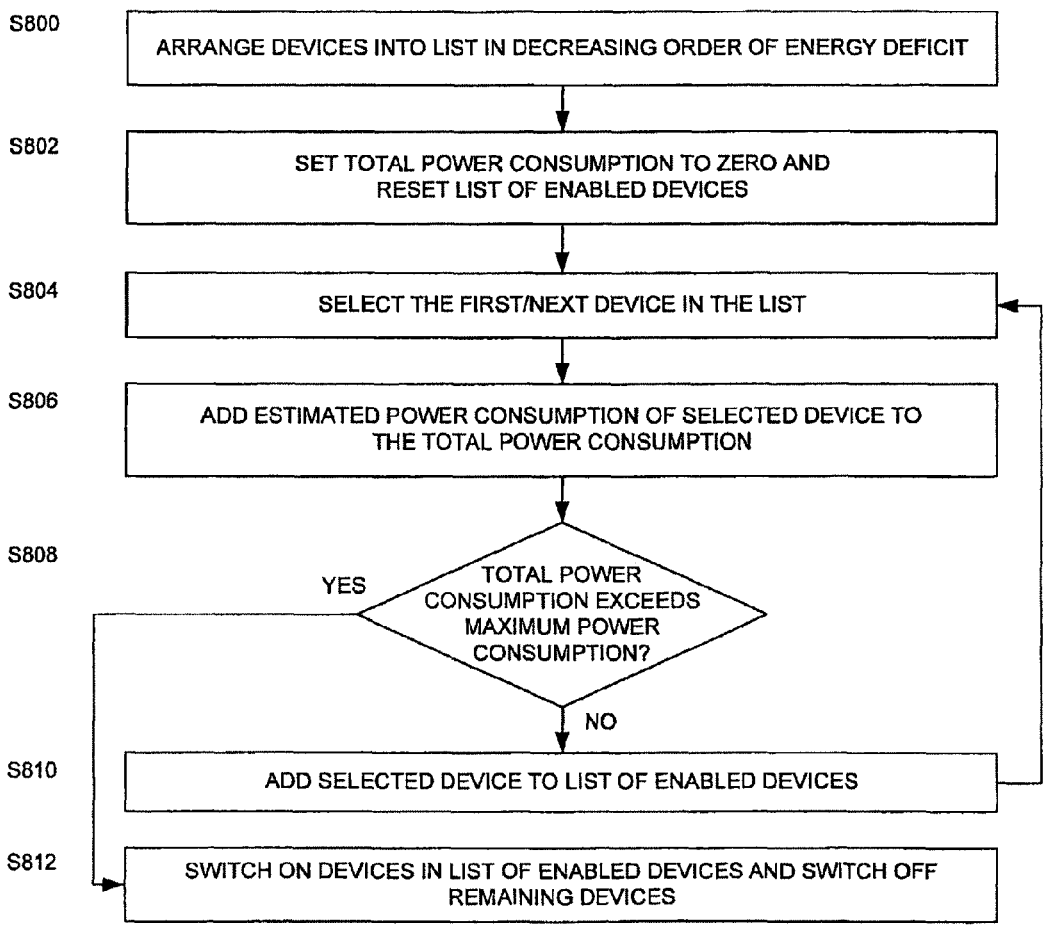
FIG. 8 is a flowchart illustrating the process of FIG. 7 in more detail.

FIG. 8 is a flowchart illustrating steps S702 and S704 of FIG. 7 in more detail.

In step S800 the devices (or rather, data representations of the devices) are arranged into a list in decreasing order of energy deficit, with the device with the largest (normalised) energy deficit at the top of the list. In step S802, a measure of total power consumption is set to zero and a list of enabled devices is reset (emptied). In step S804, the first device in the list is selected. In step S806, its estimated power consumption is added to the total power consumption sum. If the total power consumption sum does not exceed (step S808) the maximum permissible power consumption ($P_{TARGET}$), the device is added to the list of enabled devices (step S810), and the process repeats.

If the total power consumption sum does exceed the maximum permissible power consumption, the loop ends and the devices in the list of enabled devices are switched on (step S812). The remaining devices are switched off.

Figure 9:
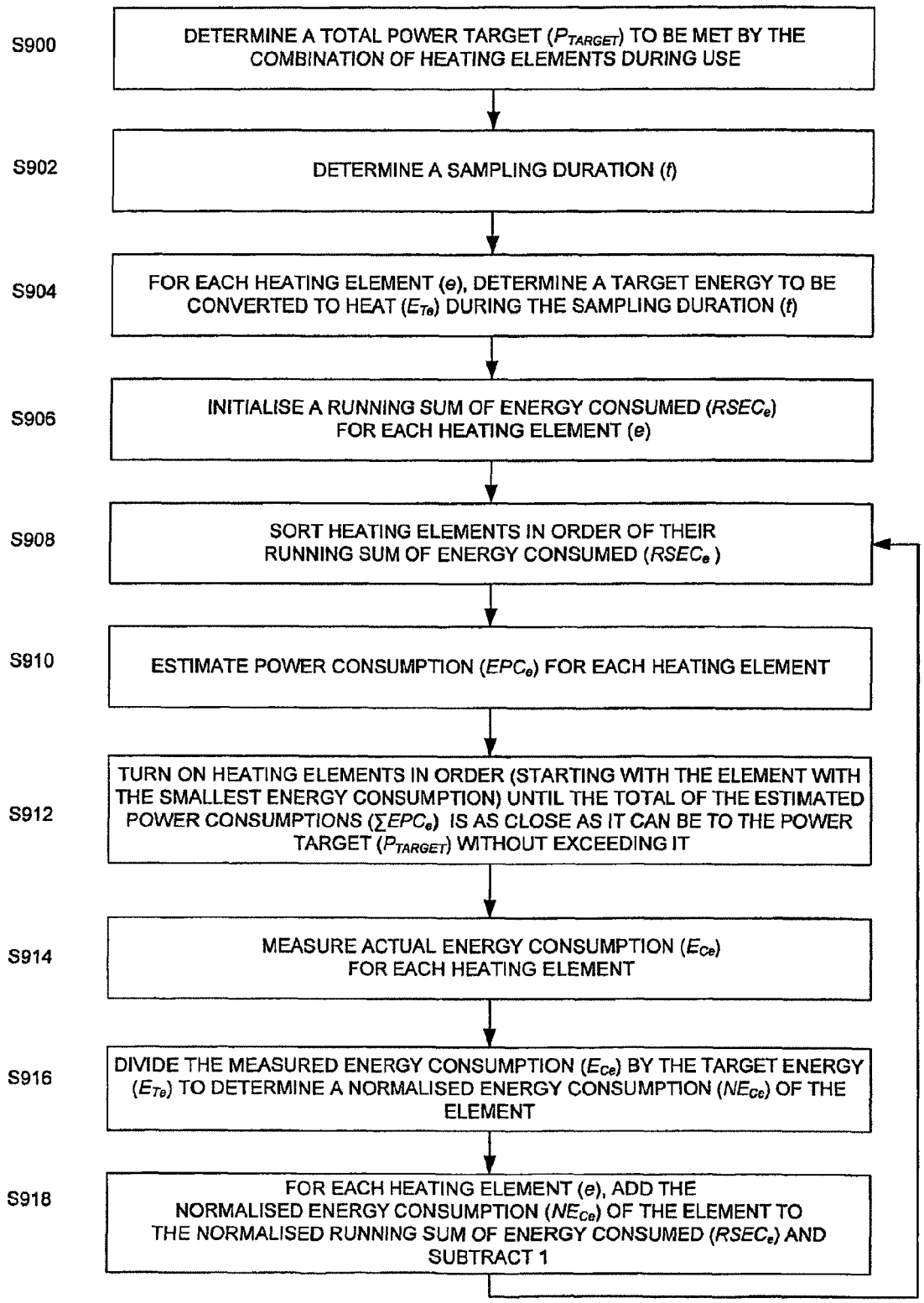
FIG. 9 is a flowchart illustrating the process of FIG. 7 in further detail.

FIG. 9 is a flowchart illustrating the process of FIG. 7 in yet further detail, including steps which form part of the configuration of the power controller, in addition to steps carried out as part of the control loop (although the division of steps between configuration and runtime activities can of course be altered as appropriate).

In step S900 the total power target ($P_{TARGET}$) is determined. A time period (t) is also determined (step S902). For each heating element (e) a target energy conversion ($E_{Te}$) during the time period (t) is determined, as described above (step S904). In step S906 the energy deficits—a (normalised) running sum of energy consumed ($RSEC_e$) for each heating element (e)—are initialised (set to zero).

In step S908, in the main control loop, the heating elements (or, rather, data representations thereof) are sorted in order of their (normalised) running sum of energy consumed ($RSEC_e$). A power consumption ($EPC_e$) is estimated for each element (e) in step S910. The heating elements are then turned on in order (step S912), starting with the element with the largest (normalised) energy deficit, until the total of the estimated power consumptions ($\Sigma EPC_e$) is as close as it can be to the power target ($P_{TARGET}$) without exceeding it.

The energy consumed ($E_{Ce}$) by each heating element (e) is measured (step S914) or otherwise determined for each heating element. This is done for example by measuring voltage and current flow ($E_{Ce}=V\times I\times t$). In step S916, the measured energy consumption ($E_{Ce}$) is divided by the target energy ($E_{Te}$) to determine a normalised energy consumption ($NE_{Ce}$) of the element.

In step S918, the normalised energy consumed by each element ($NE_{Ce}$) is added to the (normalised) running sum of energy consumed ($RSEC_e$) for the relevant heating element (e), and 1 is then subtracted from the sum. At the end of the time period t the process then loops back to step S908.

The calculation carried out in steps S916 and S918 can be summarised as:

New $RSEC_e$=Previous $RSEC_e+(E_{Ce}/E_{Te})-1$

This calculation may of course be rewritten as:

New $RSEC_e$=Previous $RSEC_e+(E_{Ce}-E_{Te})/E_{Te}$

It will be appreciated that the normalised energy consumption ($NE_{Ce}$) can be calculated by other means. For example the normalised energy consumption ($NE_{Ce}$) can be calculated by dividing the measured energy consumption ($E_{Ce}$) by an estimated or measured energy consumption (rather than by the target energy consumption). The processing in step S918 may then need to be altered to subtract (for example) the target energy consumption ($E_{Te}$) divided by the estimated or measured energy consumption ($E_{Ce}$), rather than subtracting 1 (because of the additional normalisation required). It will also be appreciated that the processing steps in steps S916 and S918 can otherwise be rearranged to change the order in which the calculation steps are carried out, for example.

FIG. 10 illustrates the operation of the heater system with reference to a simplified example in which one of the phases of the aircraft power supply is supplied to six heater elements A, B, C, D, E and F. The figure illustrates the values of the (normalised) running sum of energy ($RSEC_e$) for each of the elements A, B, C, D, E and F. The figure also indicates the switching state of the heater elements and the (normalised) energy dissipation measured for each heater element.

In step S1000, the running sum of energy is initialised (see step S906 above). In step S1002 the heaters are nominally arranged in order of running sum of energy (see step S908 above). Below each heater is indicated the estimated power consumption of the relevant heater (see step S910 above).

In the present case, a power target ($P_{TARGET}$) for the power supply phase of 6 kW is assumed. The first five heaters in the list (A-E) have an estimated power consumption totaling 5.4 kW (less that $P_{TARGET}$) and all six heaters have an estimated power consumption of 6.45 kW (greater than $P_{TARGET}$). Therefore the system enables the first five heaters and disables the last heater (see step S912 above), reflected in the switching (step S1004).

After approximately 30 milliseconds (time period t) have elapsed, the energy consumption ($E_{Ce}$) of each heater is measured (step S1006, corresponding to step S914 above). In step S1008, the normalised energy consumptions ($NE_{Ce}$) are calculated and then added to the running sums of energy. The running sums of energy are then reduced by 1 (representing the subtraction of a single target energy amount, because the running sums of energy are normalised with respect to the target energy amount) in step S1010. Overall, steps S1008 and S1010 correspond to steps S916 and S918 of FIG. 9.

The process is then repeated. In step S1012 the running sums of energy are rearranged so that the most energy deficient heater (heater F which is −1 below target, equivalent to 30 J, the target energy consumption) is at the top/left of the list. Again, the first five heaters are switched on (step S1014) because the total estimated power consumption of the first five heaters (5.64 kW) does not exceed the power target ($P_{TARGET}$) but the power consumption of all six heaters would.

After another time period has elapsed, the energy consumption is measured again and a normalised energy consumption is again computed (step S1016). The normalised energy consumptions are added to the running sums of energy (step S1018) and the running sums of energy are then reduced by 1 (step S1020). The heaters are sorted as before (step S1022), and heaters A, B, C, E and F are switched on, and heater D (the least energy deficient) is switched off (step S1024). After another time period (30 ms), the energy consumption is measured again (step S1026) and the process repeats.

It is noted that in this example five of the six heaters are always switched on and one heater is not, but different numbers of heaters can of course be provided, and differing numbers and ratios of heaters switched on and off are possible with different circumstances, power targets, and the like.

In an above-mentioned variant of the present embodiment the running sums of energy are not normalised. This can simplify the required calculations and may be appropriate when the target energy consumption of all of the elements are similar. This variant will briefly be described with reference to FIGS. 11 and 12.

Figure 11:
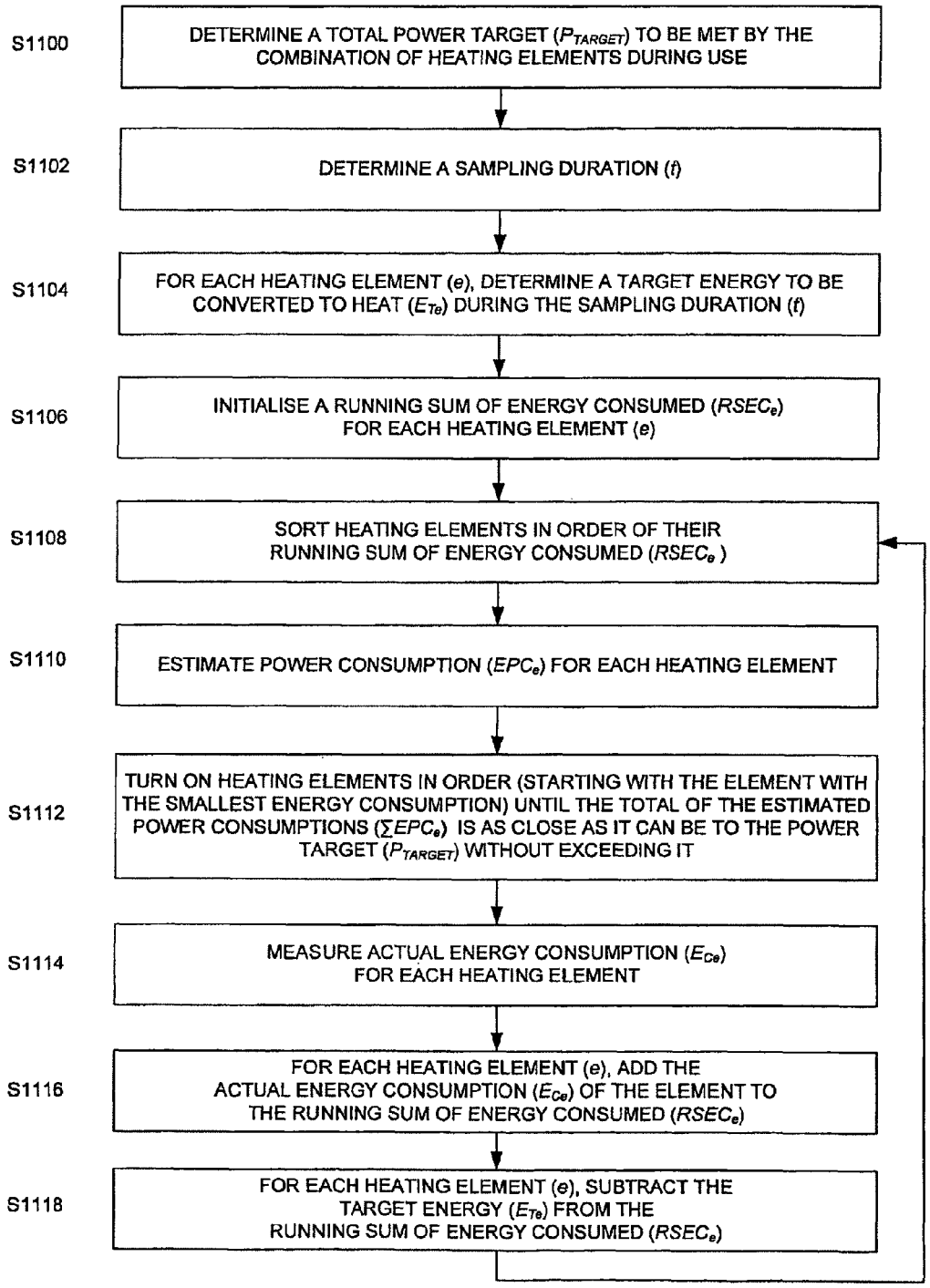
FIG. 11 is a flowchart illustrating a variant of the process of FIG. 7 in further detail.

FIG. 11 is a flowchart illustrating the variant in further detail.

In step S1100 the total power target ($P_{TARGET}$) is determined. A time period (t) is also determined (step S1102). For each heating element (e) a target energy conversion ($E_{Te}$) during the time period (t) is determined, as described above (step S1104). In step S1106 the energy deficits—a running sum of energy consumed ($RSEC_e$) for each heating element (e)—are initialised (set to zero).

In step S1108, in the main control loop, the heating elements (or, rather, data representations thereof) are sorted in order of their (non-normalised) running sum of energy consumed ($RSEC_e$). A power consumption ($EPC_e$) is estimated for each element (e) in step S1110. The heating elements are then turned on in order (step S1112), starting with the element with the largest energy deficit, until the total of the estimated power consumptions ($\Sigma EPC_e$) is as close as it can be to the power target ($P_{TARGET}$) without exceeding it.

The energy consumed ($E_{Ce}$) by each heating element (e) is measured (step S1114) or otherwise determined for each heating element. This is done for example by measuring voltage and current flow ($E_{Ce}=V \times I \times t$). In step S1116, the energy consumed by each element ($E_{Ce}$) is then added to the relevant running sum of energy consumed ($RSEC_e$). In step S1118, the target energy ($E_{Te}$) is then subtracted from the running sum of energy consumed ($RSEC_e$) for the relevant heating element (e). At the end of the time period t the process then loops back to step S1108.

The calculation carried out in steps S1116 and S1118 can be summarised as:

$$\text{New } RSEC_e = \text{Previous } RSEC_e + E_{Ce} - E_{Te}$$

Figure 12:
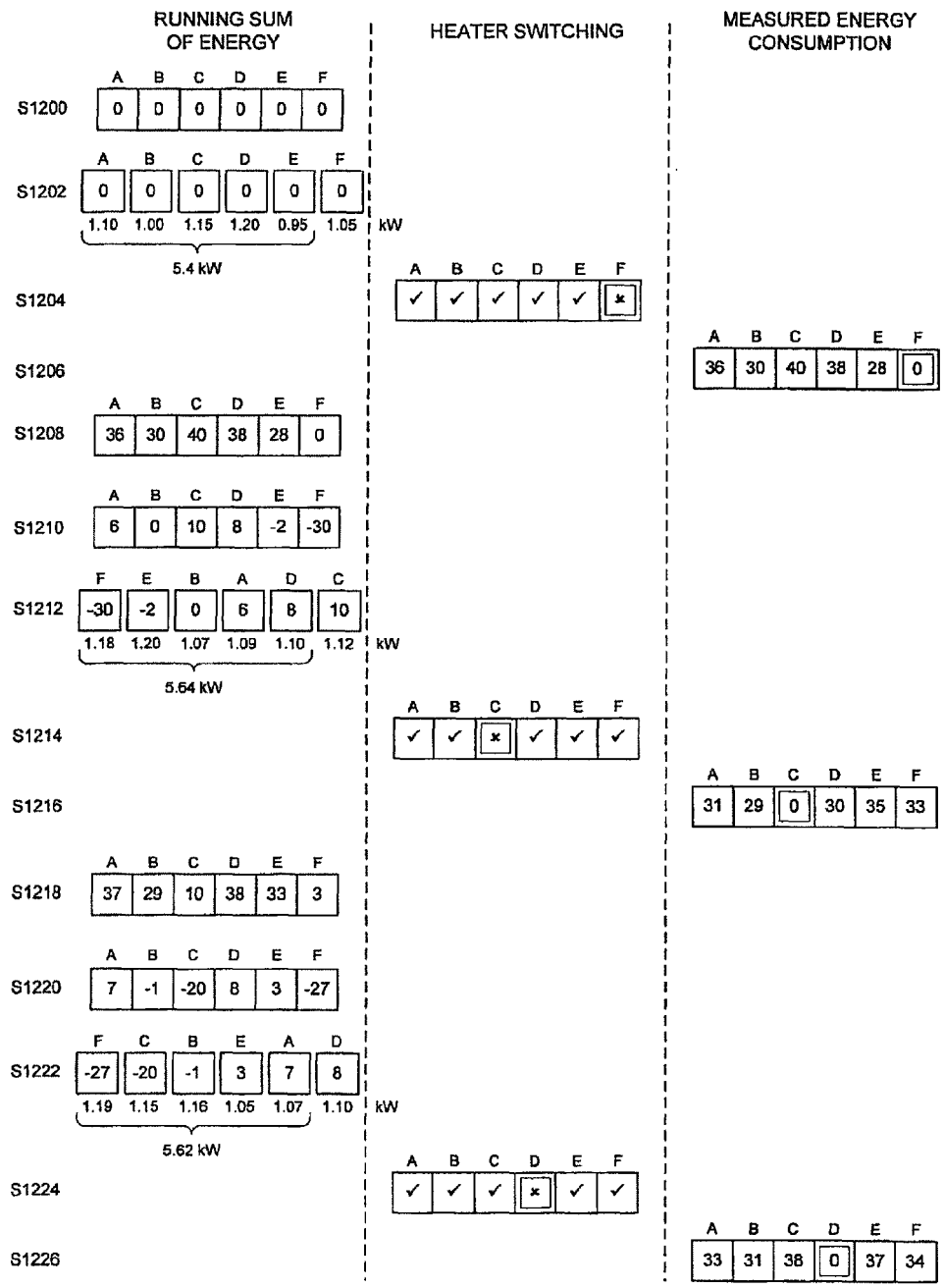
FIG. 12 is an illustration of the operation of a heater system in accordance with the process of FIG. 11.

FIG. 12 illustrates the operation of the process shown in FIG. 11 again with reference to a simplified example in which one of the phases of the aircraft power supply is supplied to six heater elements A, B, C, D, E and F. The figure illustrates the values of the (non-normalised) running sum of energy ($RSEC_e$) for each of the elements A, B, C, D, E and F. The figure also indicates the switching state of the heater elements and the energy dissipation measured for each heater element.

In step S1200, the running sum of energy is initialised (see step S1106 above). In step S1202 the heaters are nominally arranged in order of running sum of energy (see step S1108 above). Below each heater is indicated the estimated power consumption of the relevant heater (see step S1110 above).

In the present case, a power target ($P_{TARGET}$) for the power supply phase of 6 kW is assumed. The first five heaters in the list (A-E) have an estimated power consumption totaling 5.4 kW (less that $P_{TARGET}$) and all six heaters have an estimated power consumption of 6.45 kW (greater than $P_{TARGET}$). Therefore the system enables the first five heaters and disables the last heater (see step S1112 above), reflected in the switching (step S1204).

After approximately 30 milliseconds (time period t) have elapsed, the energy consumption ($E_{Ce}$) of each heater is measured (step S1206, corresponding to step S1114 above). In step S1208, the values of energy consumption ($E_{Ce}$) are added to the running sums of energy (see step S1116 above). In step S1210 the target energy consumption ($E_{Te}$), in this case 30 J for each heater (as described above) is subtracted from the running sums of energy (see step S1118 above).

The process is then repeated. In step S1212 the running sums of energy are rearranged so that the most energy deficient heater (heater F: 30 J below target) is at the top/left of the list. Again, the first five heaters are switched on (step S1214) because the total estimated power consumption of the first five heaters (5.64 kW) does not exceed the power target ($P_{TARGET}$) but the power consumption of all six heaters would.

After another time period has elapsed, the energy consumption is measured again (step S1216) and added to the running sum of energy (step S1218). The energy targets (30 J for all heaters, although a variation of this amount per heater is possible) are then subtracted (step S1220). The heaters are sorted as before (step S1222), and heaters A, B, C, E and F are switched on, and heater D (the least energy deficient) is switched off (step S1224). After another time period (30 ms), the energy consumption is measured again (step S1226) and the process repeats.

It is noted that in this example five of the six heaters are always switched on and one heater is not, but different numbers of heaters can of course be provided, and differing numbers and ratios of heaters switched on and off are possible with different circumstances, power targets, and the like.

Figure 13:
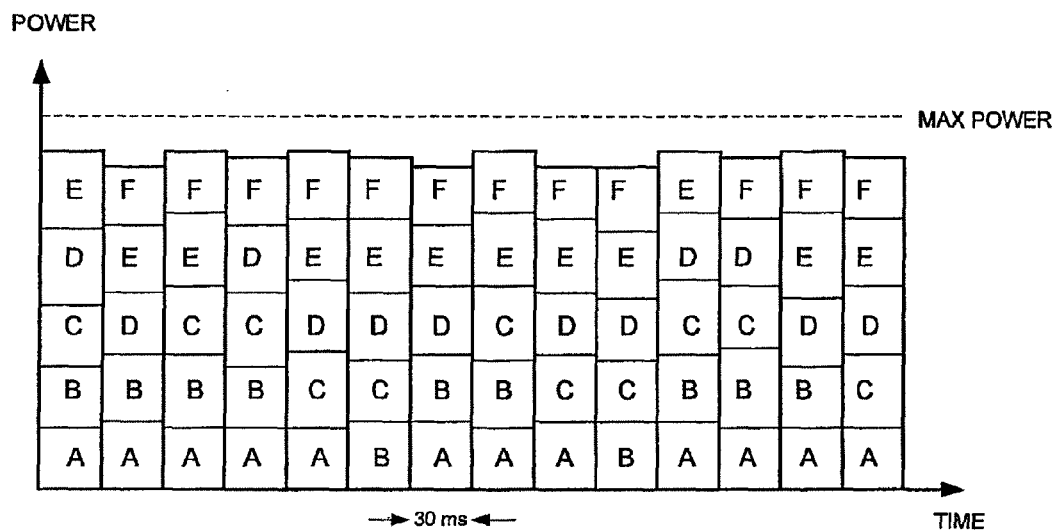
FIG. 13 is a graph illustrating the switching of heaters carried out in accordance with the process of FIG. 9.

FIG. 13 is a graphic illustration of the previously-described example of FIG. 10.

The graph shows the total power consumption of the heater elements as a vertical bar, indicating within the bar the contribution made by each heater element. With reference to FIG. 10 (or 12), for example, it can be seen that in the first bar, element F is switched off, in the second bar element C is switched off, and so on. The vertical heights are not accurately scaled and are presented for the purpose of illustration only. The maximum power (6 kW) is indicated as a dotted line on the graph. Thus the effect of the switching on the power level of the relevant phase of the power supply can be observed graphically. The time period (30 ms) is also indicated on the graph.

Figure 14:
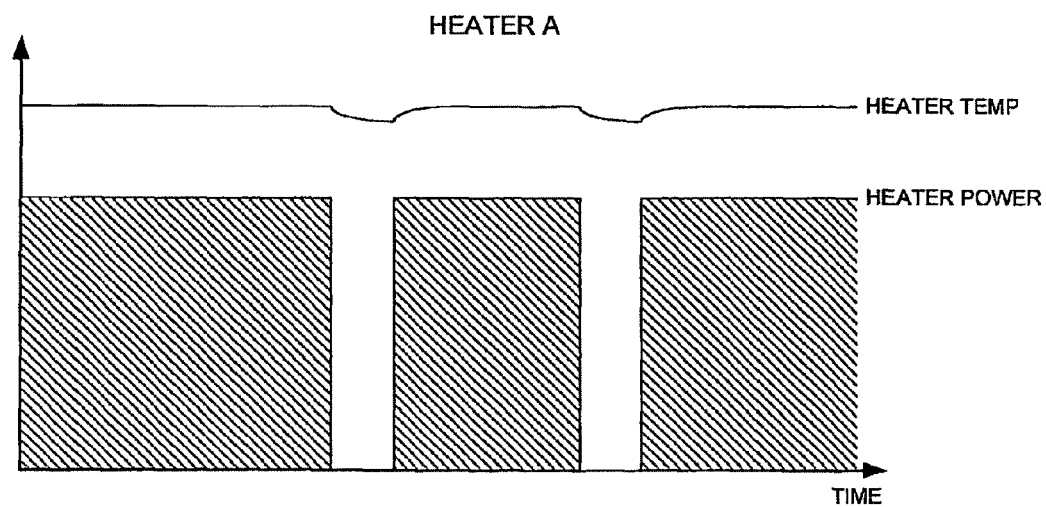
FIG. 14 is a graph illustrating the variation of power and temperature over time of one of the heaters of FIG. 13.

FIG. 14 is a graph illustrating the variation of power and temperature over time of heater A of FIGS. 10 and 13. The top of the shaded area represents the power level supplied to the heater (not to scale), and the shaded area represents the energy consumed by the heater (equivalent to power×time). The solid line above the shaded area represents the temperature of the heater (approximately). Because the time period t is small compared to the thermal time constant of the heater, the temperature of the heater (as measured at the surface of the heater mat, for example) remains essentially constant despite the power interruption. Thus the power control process does not significantly interfere with the operation of the ice protection system.

The time period of the power control system is also small compared to the 'on' times of de-icer elements (usually measured in seconds) during a de-icing cycle, and again does not interfere with the operation of this system.

Figure 15:
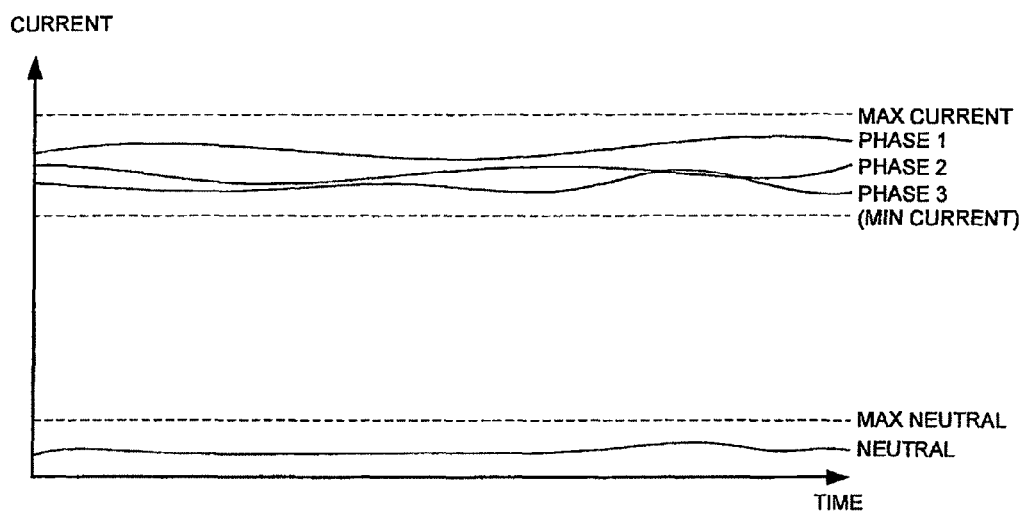
FIG. 15 is a graph illustrating typical variations of three phase and neutral currents over time for a system operating in accordance with the process of FIG. 9.

FIG. 15 is a graph illustrating variations of three phase and neutral currents over time for a system incorporating the power control system as described above. In the upper portion of the graph, three solid lines represent (schematically) the RMS current flowing in each of the three phases of a three-phase power supply, in the case where the process illustrated in FIGS. 7 to 14 is repeated for each of the three phases.

For a single phase, the process described above can result in relatively high utilisation of the available power (differing from the maximum power essentially by no more than the power consumption of a single heater element) and a relatively consistent and steady current level (for the same reason). When repeated for the other two phases, especially if the heating elements of all phases have a similar and largely constant power consumption, the result is that the three phases will be balanced to a relatively high degree. In the lower portion of the graph, a neutral current resulting from the differences between the phase currents is schematically illustrated. A dotted line shows the maximum permissible current for each of the three phases (derived from the maximum power) and the maximum neutral current.

In a system in which the power consumption PC of the heating elements is relatively constant, predictable and uniform, the total power consumption of each phase should not normally vary by more than (at more) PC watts, and should be at least (maximum power consumption—PC) W. Thus, for a well-behaved system as described above, there may exist a minimum current corresponding to the minimum power (as indicated on the figure with a third dotted line).

In the description above, an embodiment has been described with particular reference to ice protection systems for aircraft. However, it will be appreciated that the power control system can be applied to any number of phases (including just one) of an AC or indeed DC power supply. The power control system can be applied essentially to any situation where power is supplied to a plurality of devices and a relatively steady or otherwise limited power consumption is desired. With appropriate adaptation the system can be used with a household or workplace single-phase AC supply, for example, or can be used with industrial or other three-phase power supplies. Alternatively, the control system can be combined with a DC rectifier (for example) to switch a plurality of DC devices. The devices under control do not have to have similar power consumptions, although the system may provide a smoother power load if the devices do have a similar power consumption.

The use of a time period of 30 milliseconds has been described above, but of course different length and even variable length time periods may be used, depending on the devices being controlled and the frequency of the power supply. A longer time period may be appropriate for a 50 Hz AC power supply, for example, although it may be desired to constrain the time period in order to avoid the appearance of flicker in applicable devices.

Referring back to FIG. 13 in which the currents in the three AC phases varies, it is also possible for the voltages of each phase to vary and/or to differ from each other. This is another factor that can increase the neutral current.

A three (or other) phase supply with non-uniform phase voltages can be balanced by appropriate compensation of the power consumption of each of the phases. In the present embodiment this is done by calculating for each phase the difference between the total current flowing in the phase and the maximum current flowing through any of the three (or other) phases. For each phase a balancing power is then calculated by multiplying the measured phase voltage with the current deficit. The balancing power for each phase is then added to the relevant total target power of the phase. Accordingly, each of the phases will then draw an approximately equal amount of power, thus reducing the neutral current.

In a variant of the present embodiment, a similar scheme is used in which the difference between the total current flowing in each phase and the minimum (not maximum) current flowing through any of the three (or other phases). Then for each phase a balancing power is calculated by multiplying the measured phase voltage with the current deficit. The balancing power for each phase is then subtracted from (not added to) the relevant total target power of the phase. Again, each of the phases will then draw an approximately equal amount of power.

These two schemes are very similar. The first scheme will tend to increase the overall power consumption and the second scheme is more conservative and will tend to reduce the overall power consumption. Different schemes may be appropriate for different applications and generators.

The following table gives an example of an unbalanced three phase power supply, and illustrates the calculation of the balancing power for each of the three phases (in accordance with the first scheme):

| Phase | Voltage (V) | Current (A) | Current Deficit (A) | Balancing Power (W) |
|---|---|---|---|---|
| A | 225 | 100.00 | 0.00 | 0 |
| B | 237 | 94.94 | 5.06 | 1,200 |
| C | 237 | 94.94 | 5.06 | 1,200 |

Often generators impose constraints on the rate at which power usage can change (to avoid placing the generator under undue strain, for example). A typical constraint might be that power usage may not change by more than 15 kW/s (say). This can be reinterpreted as a constraint that each phase of a three phase power supply may not change its power usage by more than 5 kW/s.

In a system such as that described above in which a 30 ms switching period is used, the above-mentioned power constraint is equivalent to limiting changes in power usage during a single time period to 150 W or less (that is, 5 kW/s×30 ms).

When such a power constraint is required, the control system described above further incorporates a power slew rate limiter. When the control system is first turned on, the slew rate limiter sets the phase power target ($P_{TARGET}$) to 0, and during each subsequent time period increments the power target by the maximum phase power change per time period (150 W in the above example) until the phase power target is equal to the desired power target (such as 20 kW, for example). Similarly, when the control system is switched off, the power target is continuously decreased by the maximum power change per time period until it reaches 0.

A different slew rate for power increase and power decrease may be used. The maximum slew rate may also be a function of the aircraft configuration, flight phase, instantaneous power draw or any other factor.

A second exemplary embodiment will now be described with reference to FIGS. 14 and 15.

Figure 16:
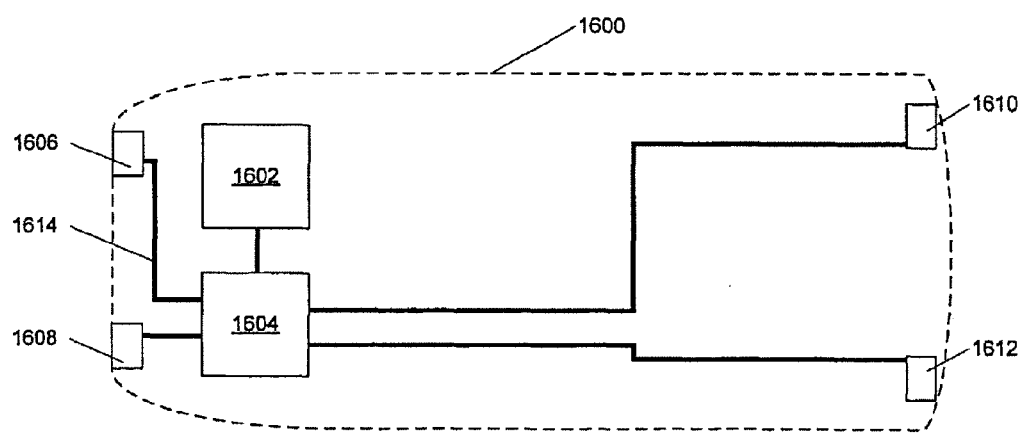
FIG. 16 is a schematic of a second embodiment, in which power is supplied to the lights of a car by a power control.

FIG. 16 shows a car 1600, including a power supply 1602 (such as a 12 V DC battery), a power controller 1604 substantially as described above, a number of lights 1606, 1608, 1610, 1612, and a number of power lines including power line 1614.

The lights 1606, 1608, 1610, 1612 may be turned on and off depending on the circumstances (for example the headlights are turned on when the environment is dark and may be switched between full-beam and dipped, and the brake lights are illuminated when the driver operates the brakes). The power consumption of the lights as a whole can therefore vary considerably, and it may be desired to reduce 'power spikes' in order to make more efficient use of the battery power and to allow the use of lighter-weight wiring rated for smaller currents.

In the second embodiment, the power controller 1604 switches power to the lights 1606, 1608, 1610, 1612 using a power control process as described above.

Figure 17:
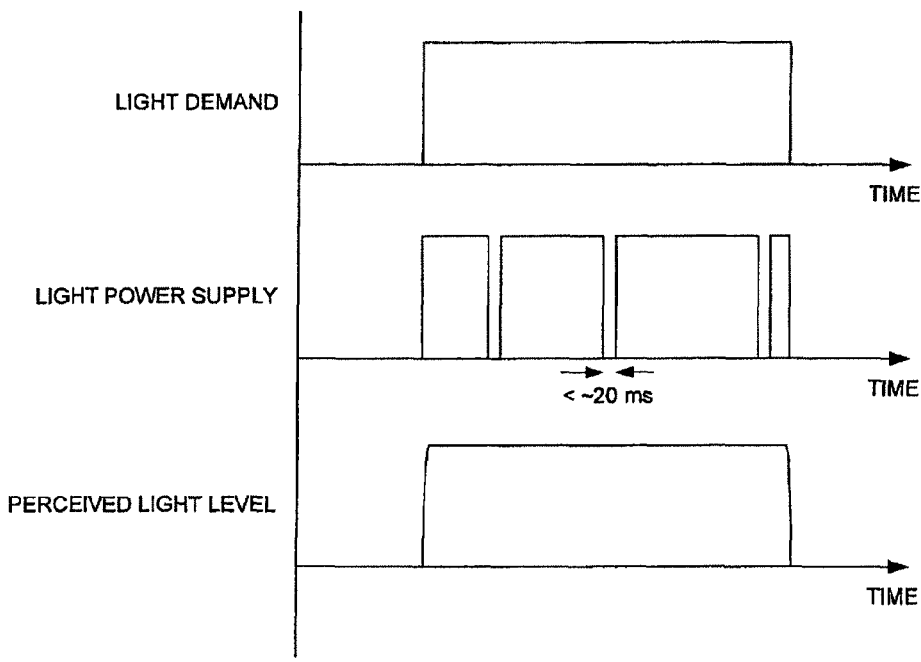
FIG. 17 is an illustration of the operation of the system of FIG. 16.

FIG. 17 illustrates the effect of the switching process for one of the lights.

The top graph in FIG. 17 shows the light demand, which may arise due to a user selection or due to the depression of a brake pedal, for example. The middle graph (not to scale) shows the actual power supplied to the light during a period in which the power system is overloaded (and therefore not all power demands can be met). The bottom graph shows the perceived light level output by the light. It will be appreciated that if the switching time period is low enough (below approximately 20 milliseconds, corresponding to a frequency of more than about 50 Hz) essentially no light flicker will be observed. It may be possible to use larger time periods due if the bulb filament has a relatively high thermal capacitance, which will reduce and/or delay the dimming of the bulb immediately after power is removed.

It will be appreciated that the power control system may be applied to other components of the vehicle, such as the dashboard lighting, indicator lights, speakers, heaters, and other electrical and electronic components.

Figure 18:
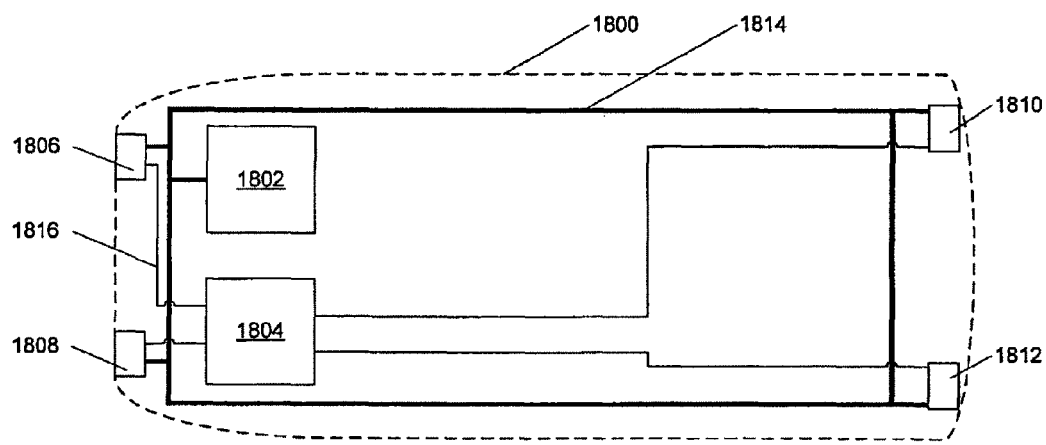
FIG. 18 is a schematic of a third embodiment, in which power is supplied to the lights of a car by a power control.

FIG. 18 schematically illustrates a third embodiment, again directed to a car controlled by a power scheme as described above.

In FIG. 18, the car 1800 includes a power supply (such as a 12 V DC supply), a power controller 1804, a set of lights 1806, 1808, 1810, 1812, a power bus 1814, and a set of control lines including control line 1816.

The power control system is essentially the same as the system of FIGS. 14 and 15, but the power functions and control functions have been separated. The lights 1806, 1808, 1810, 1812 now include a switching function, operable to supply power from the power bus to the relevant light when the relevant control line is operated. This can reduce the weight of wiring, since only one set of high power wiring needs to be provided (the power bus), and the control lines are relatively lightweight, low current wires.

In a variant of the third embodiment, the control lines are replaced with a control network linking together the devices in the car. In this variant, control switching signals are transmitted over the network to cause the switching of the lights (and optionally other devices) of the car. Dedicated control lines may be preferred for latency reasons, however.

Figure 19:
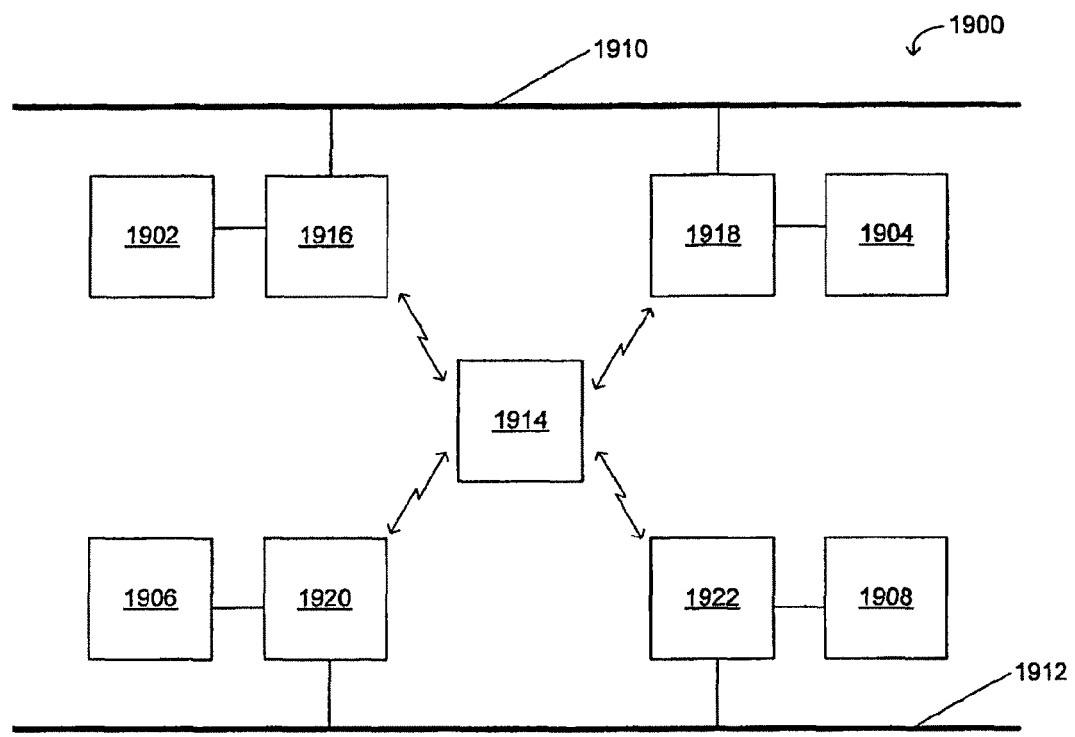
FIG. 19 is a schematic of a fourth embodiment, in which power is supplied to machines in a factory.

A fourth embodiment is illustrated schematically in FIG. 19.

FIG. 19 schematically illustrates the arrangement of machines in a factory 1900. The machines 1902, 1904, 1906, 1908 may be any applicable industrial machine, including (but not limited to) lathes, presses, assembly lines, heaters, robots, and the like. The machines are powered by power supplies 1910, 1912, which may be one or more phases of AC power, for example. The supply of power to the machines 1902, 1904, 1906, 1908 is overseen by a power controller 1914, which is in wireless (or wired) communication with a plurality of switches 1916, 1918, 1920, 1922.

The power controller 1914 uses the above-described power control methods to balance the power consumed by the machines 1902, 1904, 1906, 1908 in order to avoid overloading the power supply and also to maintain a near-unity power factor for the power supply drawn by the factory (to avoid the electricity provider company applying contractual penalties, for example).

Returning to the first embodiment as illustrated for example in FIGS. 1 and 2, another issue that may arise is the accuracy of the voltage and/or current sensors used to implement the control system. The voltage and current sensors that might typically be used can drift out of calibration, which can reduce the accuracy of the power delivery.

Figure 20:
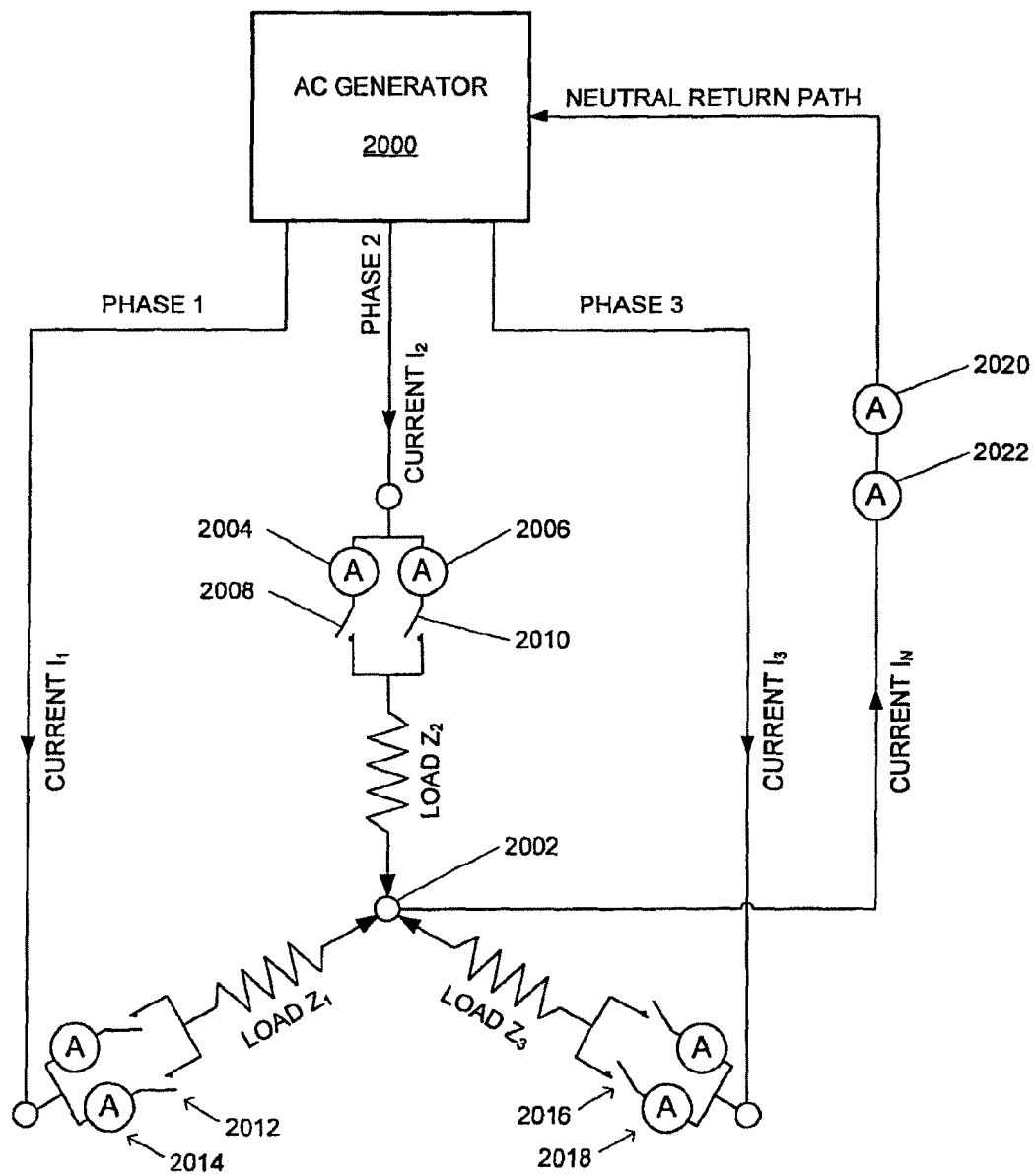
FIG. 20 is a schematic showing a current sensor calibration system for use with the heater elements of FIG. 2.

FIG. 20 is a schematic showing a current sensor calibration system for use with the heater elements of FIG. 2. The generator 2000 and interconnection point 2002 of the three phases 1, 2, 3 output by the generator are shown. The three loads $Z_1$, $Z_2$ and $Z_3$ correspond to the resistance elements in the three respective heater elements 202, 204, 206 of the heater zone 200 of FIG. 2. The heater elements may also correspond for example to a single heater element from each of the groups 304, 306, 308 of elements shown in FIG. 3. During operation of the ice protection system, currents $I_1$, $I_2$ and $I_3$ flow through each of the three respective phases 1, 2, 3 output by the generator 2000.

In each of the heater element circuits, a switching unit (such as the switches 310, 312, 314, 316 and so on of FIG. 3) is provided in series with the heater element (the load), and one terminal of each heater element is connected (indirectly) to the neutral return path. For the purpose of redundancy, each switching unit comprises two switches that can be independently operated. The switches are designed such that in the event of a failure the switch will fail open. Thus, the heater element can still be switched by one of the switches in a switching unit even if the other has failed. It will be appreciated that in each switching unit only one switch (or many switches) may be provided if desired.

In order to determine the functionality of each switch and to determine the current (and hence power) flowing through each heater element, a current sensor is provided in series with each of the switches in the switching unit. Thus in one of the phases (the second phase), for example, two current sensors 2004, 2006 and two switches 2008, 2010 are provided. Similarly, in the first phase circuit, a set 2012 of switches and a set 2014 of current sensors are provided, and again a set 2016 of switches and a set 2018 of current sensors are provided in the third phase circuit. In the present embodiment 144 heater elements are provided, and thus a total of 288 current sensors are provided for the heater elements. Because of the large number of current sensors that are required, relatively inexpensive (and thus relatively inaccurate) current sensors may be used.

Two further current sensors 2020, 2022 are provided in the neutral return path to measure the neutral current $I_N$ flowing back to the generator. Two sensors are provided for redundancy, but one sensor (or many sensors) may alternatively be provided. Because only two neutral current sensors are provided, relatively accurate (and expensive) current sensors can be used. As will be described below, various switching schemes can be employed to calibrate the less accurate current sensors 2004, 2006, 2014, 2018 using the more accurate neutral path current sensors 2020, 2022.

During one of the switching periods of the power control scheme, every heater element except a heater element under test (such as the load $Z_2$) is switched off. The first switch 2008 is closed and the second switch 2010 is opened, so that the current $I_2$ flowing through the current sensor 2004 and the load $Z_2$ is equal to the neutral return current $I_N$. The current readings from the current sensors 2020, 2022 can then be used to calibrate the current sensor 2004 (for example by adjusting an offset and gain of the sensor 2004). The switch 2008 is opened and the switch 2010 is then closed, and the process is repeated for the second current sensor 2006. Alternatively, both switches 2008, 2010 can be closed (so that, all things being equal, the current is split evenly between the current sensors 2004, 2006) to allow the calibration to be carried out during a single switching period.

The calibration process is repeated for the current sensors for every other heater element in turn. In order to avoid disruption to the heating schedule, the calibration cycles are interspersed between large numbers of 'normal' switching cycles in order to avoid disruption to the ice protection system.

In addition, the calibration switching scheme can used to carry out a test of individual heater elements (especially if, in an alternative embodiment, no individual current sensors are provided for each element). With the measurement of the neutral current (and therefore a measurement of the current flowing through the heater element) and a measurement of the relevant phase voltage, the resistance and/or power consumption of the relevant heater element can be computed using Ohm's law and the like (V=IR, P=IV, and so on). Any spurious resistance or power values can then be identified that might indicate a fault condition (such as a short circuit to one of the other phases, a short circuit to neutral, a short circuit to ground or a degradation of the heater element to above or below allowed resistance levels, for example) and an appropriate error signal can be generated. The scheme can also be adapted to test for groups of elements as appropriate.

It will be appreciated that the calibration scheme described above can be adapted as necessary to deal with a larger number of current sensors (such as multiple current sensors in each phase, for example) and to operate with respect to multiple heater elements at once. In an alternative embodiment, a neutral current sensor is provided for each set of heater elements (or alternatively, for a group of heater zones). This requires more neutral current sensors, but can allow calibration to be carried out on smaller areas of the ice protection system, reducing the overall disruption to the heating schedule.

As has been mentioned above, the control system of the various embodiments described above can be applied to a variety of different power systems, including AC and DC. Furthermore, it will be appreciated that the control systems can be applied both to 'star' loads with a neutral line (as illustrated in FIG. 4, for example) but also to 'delta' loads and any other possible configuration of the power supply.

Further modifications lying within the spirit and scope of the present invention will be apparent to a skilled person in the art.

The invention claimed is:

1. A method of controlling the distribution of power to a plurality of devices, the method being carried out by a power controller during a plurality of time periods, and the method being carried out during each time period after a first time period comprising:
    determining an energy or power deficit for each device based on the difference between a target amount of energy or power and a measured amount of energy or power supplied to the device prior to the current time period;
    selecting at least one device in decreasing order of energy or power deficit, whereby priority is given to devices having the largest energy or power deficit or the smallest energy or power surplus, until the selection of any further devices will cause a total estimated power consumption of the selected devices during the time period to exceed a predetermined maximum power consumption; and
    causing the power controller to supply power to the or each selected device during the time period.

2. A method according to claim 1, wherein power is not supplied to unselected devices.

3. A method according to claim 1, wherein, for time periods other than the first, the determination of an energy or power deficit for each device comprises subtracting (a) a target amount of energy or power desired to be supplied to the device during the preceding time period from the sum of: (b) a measurement of the actual amount of energy or power supplied to the device during the preceding time period, and (c) the determined energy or power deficit of the preceding time period.

4. A method according to claim 3, wherein, for the first time period, the method comprises setting the energy or power deficit to an initialisation value.

5. A method according to claim 1, wherein the selection of at least one device comprises:
arranging device data associated with respective devices into a list sorted by decreasing size of energy or power deficit of each respective device;
selecting device data from the top of the list;
calculating the total estimated power consumption of the devices associated with the selected device data; and
continuing the selection of device data until the selection of any further device data would cause the total estimated power consumption to exceed the predetermined maximum power consumption.

6. A method according to claim 1, wherein supplying power to the or each selected device comprises switching on the or each selected device and switching off unselected devices.

7. A method according to claim 6 for use with an alternating current power supply, wherein the method further comprises switching the or each device at zero-crossing points of the current or voltage of the power supply.

8. A method according to claim 1 for use with a multiple phase power supply, wherein the method is carried out in respect of each phase of the multiple phase power supply.

9. A method according to claim 8, further comprising processing a signal representative of an imbalance in the current or voltage of the multiple phases, and adjusting the maximum power consumption in order to reduce the imbalance.

10. A method according to claim 8 for use with a power supply including a neutral path, wherein the method further comprises supplying power during at least one time period through only a selected one of the phases, processing a signal representative of a measurement of the current flowing through the neutral path, and determining an electrical property of at least one of the devices connected to said selected one of the phases in dependence on the current measurement.

11. A method according to claim 10, further comprising calibrating an electrical sensor connected to said selected one of the phases in dependence on the determined electrical property.

12. A method according to claim 1, wherein the plurality of devices comprises a plurality of heater elements, and the time period is less than the thermal time constant of at least one of the heater elements.

13. A method according to claim 1, further comprising substantially normalising the energy or power deficit with respect to the target amount of energy or power respectively.

14. Apparatus for controlling the distribution of power to a plurality of devices during a plurality of time periods, the apparatus comprising:
means for determining an energy or power deficit for each device during each time period, the determination being based on the difference between a target amount of energy or power and a measured amount of energy or power supplied to the device prior to the time period;
means for selecting at least one device during each time period in decreasing order of energy or power deficit, whereby priority is given to devices having the largest energy or power deficit or the smallest energy or power surplus, until the selection of any further devices will cause a total estimated power consumption of the selected devices during the time period to exceed a predetermined maximum power consumption; and
means for supplying power to the or each selected device during each time period.

15. Apparatus according to claim 14, wherein the means for supplying power is operable to not supply power to unselected devices.

16. Apparatus according to claim 14, wherein the means for determining an energy or power deficit is operable, in respect of time periods other than the first, to determine the energy or power deficit for each device by subtracting (a) a target amount of energy or power desired to be supplied to the device during the preceding time period from the sum of: (b) a measurement of the actual amount of energy or power supplied to the device during the preceding time period, and (c) the determined energy or power deficit of the preceding time period.

17. Apparatus according to claim 16, wherein the means for determining an energy or power deficit is operable, in respect of the first time period, to set the energy or power deficit to an initialisation value.

18. Apparatus according to claim 14, wherein the means for selecting at least one device is operable to:
arrange device data associated with respective devices into a list sorted by decreasing size of energy or power deficit of each respective device;
select device data from the top of the list;
calculate the total estimated power consumption of the devices associated with the selected device data; and
continue the selection of device data until the selection of any further device data would cause the total estimated power consumption to exceed the predetermined, maximum power consumption.

19. Apparatus according to claim 14, wherein the means for supplying power to the or each selected device is operable to switch on the or each selected device and to switch off unselected devices.

20. Apparatus according to claim 19, operable with an alternating current power supply, and wherein the means for supplying power is operable to switch the or each device at zero-crossing points of the current or voltage of the power supply.

21. Apparatus according to claim 14, operable to supply power from a plurality of phases of a multiple phase power supply.

22. Apparatus according to claim 21, further comprising means for processing a signal representative of an imbalance in the current or voltage of the multiple phases, and means for adjusting the maximum power consumption in order to reduce the imbalance.

23. Apparatus according to claim 21, operable with a power supply including a neutral path, wherein the apparatus is operable to supply power during at least one time period through only a selected one of the phases, to process a signal representative of a measurement of the current flowing through the neutral path, and to determine an electrical property of at least one of the devices connected to said selected one of the phases in dependence on the current measurement.

24. Apparatus according to claim 23, further comprising means for calibrating an electrical sensor connected to said selected one of the phases in dependence on the determined electrical property.

25. Apparatus according to claim 14, wherein the plurality of devices comprises a plurality of heater elements, and the time period is less than the thermal time constant of at least one of the heater elements.

26. Apparatus according to claim 14, wherein the apparatus is operable substantially to normalise the energy or power deficit with respect to the target amount of energy or power respectively.

27. A vehicle comprising:
a power supply;
a plurality of devices; and
apparatus as claimed in claim 14, for supplying power from the power supply to the plurality of devices.

28. An ice protection system for an aircraft, including apparatus as claimed in claim 14.

29. A power controller for controlling the distribution of power to a plurality of devices during a plurality of time periods, comprising:
a switching unit for switching power to said plurality of devices;
an instruction memory storing processor implementable instructions; and
a processor operable to process data in accordance with instructions stored in the instruction memory;
wherein the instructions stored in the instruction memory comprise instructions for controlling the processor to perform a method comprising:
determining an energy or power deficit during each time period for each device based on the difference between a target amount of energy or power and a measured amount of energy or power supplied to the device prior to the time period;
selecting at least one device during each time period in decreasing order of energy or power deficit, whereby priority is given to devices having the largest energy or power deficit or the smallest energy or power surplus, until the selection of any further devices will cause a total estimated power consumption of the selected devices during the time period to exceed a predetermined maximum power consumption; and
supplying power to the or each selected device during the time period.

30. A power controller according to claim 29, wherein the instructions when executed by the processor cause the power controller not to supply power to unselected devices.

31. A power controller according to claim 29, wherein the instructions when executed by the processor cause the power controller, in respect of time periods other than the first, to determine of an energy or power deficit for each device by subtracting (a) a target amount of energy or power desired to be supplied to the device during the preceding time period from the sum of: (b) a measurement of the actual amount of energy or power supplied to the device during the preceding time period, and (c) the determined energy or power deficit of the preceding time period.

32. A power controller according to claim 31, wherein the instructions when executed by the processor cause the power controller, in respect of the first time period, to set the energy or power deficit to an initialisation value.

33. A power controller according to claim 29, wherein the instructions when executed by the processor cause the power controller to select at least one device by:
arranging device data associated with respective devices into a list sorted by decreasing size of energy or power deficit of each respective device;
selecting device data from the top of the list;
calculating the total estimated power consumption of the devices associated with the selected device data; and
continuing the selection of device data until the selection of any further device data would cause the total estimated power consumption to exceed the predetermined maximum power consumption.

34. A power controller according to claim 29, wherein the instructions when executed by the processor cause the power controller to supply power to the or each selected device by switching on the or each selected device and switching off unselected devices.

35. A power controller according to claim 34, wherein the power controller is operable to supply power from an alternating current power supply, and the instructions when executed by the processor cause the power controller to switch the or each device at zero-crossing points of the current or voltage of the power supply.

36. A power controller according to claim 29, wherein the power controller is operable to supply power from a plurality of phases of a multiple phase power supply.

37. A power controller according to claim 36, wherein the power controller is operable to process a signal representative of an imbalance in the current or voltage of the multiple phases, and to adjust the maximum power consumption in order to reduce the imbalance.

38. A power controller according to claim 36 for use with a power supply including a neutral path, wherein the power controller is operable to supply power during at least one time period through only a selected one of the phases, to process a signal representative of a measurement of the current flowing through the neutral path, and to determine an electrical property of at least one of the devices connected to said selected one of the phases in dependence on the current measurement.

39. A power controller according to claim 38, operable to calibrate an electrical sensor connected to said selected one of the phases in dependence on the determined electrical property.

40. A power controller according to claim 29, wherein the plurality of devices comprises a plurality of heater elements, and the time period is less than the thermal time constant of at least one of the heater elements.

41. A power controller according to claim 29, operable substantially to normalise the energy or power deficit with respect to the target amount of energy or power respectively.

42. A method of controlling the distribution of power to a plurality of devices, the method being carried out by a power controller during a plurality of time periods, and the method being carried out during each time period comprising:
determining an energy or power deficit for each device;
selecting at least one device, giving priority to devices having the largest energy or power deficit, such that as many devices as possible are selected without causing a total estimated power consumption of the selected devices during the time period to exceed a predetermined maximum power consumption; and
causing the power controller to supply power to the or each selected device during the time period.

43. Apparatus for controlling the distribution of power to a plurality of devices during a plurality of time periods, the apparatus comprising:
means for determining an energy or power deficit for each device during each time period;
means for selecting at least one device during each time period, giving priority to devices having the largest energy or power deficit, such that as many devices as possible are selected without causing a total estimated power consumption of the selected devices during the time period to exceed a predetermined maximum power consumption; and
means for controlling the distribution of the power such that power is supplied to the or each selected device during the time period.

* * * * *